US008478240B2

(12) United States Patent
Aaltonen et al.

(10) Patent No.: US 8,478,240 B2
(45) Date of Patent: Jul. 2, 2013

(54) SYSTEMS, METHODS, NETWORK ELEMENTS AND APPLICATIONS FOR MODIFYING MESSAGES

(75) Inventors: Janne Aaltonen, Turku (FI); Sami Saru, Turku (FI)

(73) Assignee: Apple Inc., Cupertino, CA (US)

( * ) Notice: Subject to any disclaimer, the term of this patent is extended or adjusted under 35 U.S.C. 154(b) by 741 days.

(21) Appl. No.: 12/204,967

(22) Filed: Sep. 5, 2008

(65) Prior Publication Data

US 2009/0068991 A1 Mar. 12, 2009

Related U.S. Application Data

(60) Provisional application No. 61/970,160, filed on Sep. 5, 2007.

(51) Int. Cl.
*H04M 1/725* (2006.01)
*H04W 4/00* (2009.01)
*G06Q 30/00* (2006.01)

(52) U.S. Cl.
USPC ............ 455/412.1; 455/412.2; 455/466; 705/14.1

(58) Field of Classification Search
USPC ............ 455/411, 466, 412.1, 412.2; 705/14.1
See application file for complete search history.

(56) References Cited

U.S. PATENT DOCUMENTS

| 5,408,519 A | 4/1995 | Pierce et al. |
|---|---|---|
| 5,459,306 A | 10/1995 | Stein et al. |
| 5,600,364 A | 2/1997 | Hendricks et al. |
| 5,613,213 A | 3/1997 | Naddell et al. |
| 5,678,179 A | 10/1997 | Turcotte et al. |
| 5,978,775 A | 11/1999 | Chen |
| 5,978,833 A | 11/1999 | Pashley et al. |
| 6,006,197 A | 12/1999 | d'Eon et al. |
| 6,009,410 A | 12/1999 | LeMole et al. |
| 6,023,700 A | 2/2000 | Owens et al. |
| 6,055,512 A | 4/2000 | Dean et al. |
| 6,055,513 A | 4/2000 | Katz et al. |
| 6,057,872 A | 5/2000 | Candelore |

(Continued)

FOREIGN PATENT DOCUMENTS

| BE | 1015704 | 7/2005 |
|---|---|---|
| DE | 19941461 | 3/2001 |

(Continued)

OTHER PUBLICATIONS

Combined Search and Examination Report for United Kingdom Patent Application No. GB 0816228.1 dated Jan. 6, 2009.

(Continued)

*Primary Examiner* — Kamran Afshar
*Assistant Examiner* — Omoniyi Obayanju
(74) *Attorney, Agent, or Firm* — Novak Druce Connolly Bove + Quigg LLP

(57) ABSTRACT

Methodologies and mechanisms are provided that enable the monitoring of communication dialogs or sessions between a plurality of users or a user and a content service and a determination of content to be added to current and/or future messages sent in the communication dialog(s) or session(s) based on content of one or more previously sent messages.

In embodiments of the invention the message and previous message comprising the dialogue(s) or session(s) are transmitted between a first party and a second party and the messages are intercepted en route for a respective party.

100 Claims, 6 Drawing Sheets

U.S. PATENT DOCUMENTS

| | | |
|---|---|---|
| 6,097,942 A | 8/2000 | Laiho |
| 6,253,189 B1 | 6/2001 | Feezell et al. |
| 6,286,005 B1 | 9/2001 | Cannon |
| 6,334,145 B1 | 12/2001 | Adams et al. |
| 6,338,044 B1 | 1/2002 | Cook et al. |
| 6,345,279 B1 | 2/2002 | Li et al. |
| 6,381,465 B1 | 4/2002 | Chern et al. |
| 6,393,407 B1 | 5/2002 | Middleton, III et al. |
| 6,405,243 B1 | 6/2002 | Nielsen |
| 6,408,309 B1 | 6/2002 | Agarwal |
| 6,446,261 B1 | 9/2002 | Rosser |
| 6,502,076 B1 | 12/2002 | Smith |
| 6,684,249 B1 | 1/2004 | Frerichs et al. |
| 6,690,394 B1 | 2/2004 | Harui |
| 6,698,020 B1 | 2/2004 | Zigmond et al. |
| 6,718,551 B1 | 4/2004 | Swix et al. |
| 6,738,978 B1 | 5/2004 | Hendricks et al. |
| 6,886,000 B1 | 4/2005 | Aggarwal et al. |
| 6,920,326 B2 | 7/2005 | Agarwal et al. |
| 6,990,462 B1 | 1/2006 | Wilcox et al. |
| 7,039,599 B2 | 5/2006 | Merriman et al. |
| 7,072,947 B1 | 7/2006 | Knox et al. |
| 7,149,537 B1 | 12/2006 | Kupsh et al. |
| 7,168,084 B1 | 1/2007 | Hendricks et al. |
| 7,203,684 B2 | 4/2007 | Carobus et al. |
| 7,280,818 B2 | 10/2007 | Clayton |
| 7,356,477 B1 | 4/2008 | Allan et al. |
| 7,370,002 B2 | 5/2008 | Heckerman et al. |
| 7,539,652 B2 | 5/2009 | Flinn et al. |
| 7,558,559 B2 | 7/2009 | Alston |
| 7,669,212 B2 | 2/2010 | Alao et al. |
| 7,685,019 B2 | 3/2010 | Collins |
| 7,730,017 B2 | 6/2010 | Nance et al. |
| 7,734,632 B2 | 6/2010 | Wang |
| 7,747,676 B2 | 6/2010 | Nayfeh et al. |
| 7,912,843 B2 | 3/2011 | Murdock et al. |
| 8,046,797 B2 | 10/2011 | Bentolila et al. |
| 8,060,406 B2 | 11/2011 | Blegen |
| 8,229,786 B2 | 7/2012 | Cetin et al. |
| 2001/0044739 A1 | 11/2001 | Bensamana |
| 2001/0047272 A1 | 11/2001 | Frietas et al. |
| 2001/0051925 A1 | 12/2001 | Kang |
| 2002/0006803 A1 | 1/2002 | Mendiola et al. |
| 2002/0016736 A1 | 2/2002 | Cannon et al. |
| 2002/0019829 A1 | 2/2002 | Shapiro |
| 2002/0052781 A1 | 5/2002 | Aufricht et al. |
| 2002/0075305 A1 | 6/2002 | Beaton et al. |
| 2002/0077130 A1 | 6/2002 | Owensby |
| 2002/0078147 A1 | 6/2002 | Bouthors et al. |
| 2002/0083411 A1 | 6/2002 | Bouthors et al. |
| 2002/0099842 A1 | 7/2002 | Jennings et al. |
| 2002/0120498 A1 | 8/2002 | Gordon et al. |
| 2002/0137507 A1 | 9/2002 | Winkler |
| 2002/0138291 A1 | 9/2002 | Vaidyanathan et al. |
| 2002/0161770 A1 | 10/2002 | Shapiro et al. |
| 2002/0164977 A1 | 11/2002 | Link, II et al. |
| 2002/0165773 A1 | 11/2002 | Natsumo et al. |
| 2002/0175935 A1 | 11/2002 | Wang et al. |
| 2003/0003935 A1 | 1/2003 | Vesikivi et al. |
| 2003/0023489 A1 | 1/2003 | McGuire et al. |
| 2003/0040297 A1 | 2/2003 | Pecen et al. |
| 2003/0083931 A1 | 5/2003 | Lang |
| 2003/0101454 A1 | 5/2003 | Ozer et al. |
| 2003/0126015 A1 | 7/2003 | Chan et al. |
| 2003/0126146 A1 | 7/2003 | Van Der Riet |
| 2003/0130887 A1 | 7/2003 | Nathaniel |
| 2003/0154300 A1 | 8/2003 | Mostafa |
| 2003/0182567 A1 | 9/2003 | Barton et al. |
| 2003/0188017 A1 | 10/2003 | Nomura |
| 2003/0191689 A1 | 10/2003 | Bosarge et al. |
| 2003/0197719 A1 | 10/2003 | Lincke et al. |
| 2004/0003398 A1 | 1/2004 | Donian et al. |
| 2004/0043777 A1 | 3/2004 | Brouwer et al. |
| 2004/0045029 A1 | 3/2004 | Matsuura |
| 2004/0054576 A1 | 3/2004 | Kanerva et al. |
| 2004/0068435 A1 | 4/2004 | Braunzell |
| 2004/0133480 A1 | 7/2004 | Domes |
| 2004/0136358 A1 | 7/2004 | Hind et al. |
| 2004/0158858 A1 | 8/2004 | Paxton et al. |
| 2004/0185883 A1 | 9/2004 | Rukman |
| 2004/0192359 A1 | 9/2004 | McRaild et al. |
| 2004/0203761 A1 | 10/2004 | Baba et al. |
| 2004/0203851 A1 | 10/2004 | Vetro et al. |
| 2004/0204133 A1 | 10/2004 | Andrew et al. |
| 2004/0209649 A1 | 10/2004 | Lord |
| 2004/0259526 A1 | 12/2004 | Goris et al. |
| 2005/0010641 A1 | 1/2005 | Staack |
| 2005/0021397 A1 | 1/2005 | Cui et al. |
| 2005/0060425 A1 | 3/2005 | Yeh et al. |
| 2005/0075929 A1 | 4/2005 | Wolinsky et al. |
| 2005/0125397 A1 | 6/2005 | Gross et al. |
| 2005/0138140 A1 | 6/2005 | Wen et al. |
| 2005/0228680 A1 | 10/2005 | Malik |
| 2005/0228797 A1 | 10/2005 | Koningstein et al. |
| 2005/0229209 A1 | 10/2005 | Hildebolt et al. |
| 2005/0239495 A1 | 10/2005 | Bayne |
| 2005/0239504 A1 | 10/2005 | Ishii et al. |
| 2005/0249216 A1 | 11/2005 | Jones |
| 2005/0267798 A1 | 12/2005 | Panara |
| 2005/0273465 A1 | 12/2005 | Kimura |
| 2005/0273833 A1 | 12/2005 | Soinio |
| 2005/0289113 A1 | 12/2005 | Bookstaff |
| 2006/0031327 A1 | 2/2006 | Kredo |
| 2006/0040642 A1 | 2/2006 | Boris et al. |
| 2006/0048059 A1 | 3/2006 | Etkin |
| 2006/0059133 A1 | 3/2006 | Moritani |
| 2006/0068845 A1 | 3/2006 | Muller et al. |
| 2006/0075425 A1 | 4/2006 | Koch et al. |
| 2006/0095511 A1 | 5/2006 | Munarriz et al. |
| 2006/0117378 A1 | 6/2006 | Tam et al. |
| 2006/0123014 A1 | 6/2006 | Ng |
| 2006/0129455 A1 | 6/2006 | Shah |
| 2006/0141923 A1 | 6/2006 | Goss |
| 2006/0161520 A1 | 7/2006 | Brewer et al. |
| 2006/0167747 A1* | 7/2006 | Goodman et al. .............. 705/14 |
| 2006/0168616 A1 | 7/2006 | Candelore |
| 2006/0194595 A1 | 8/2006 | Myllynen et al. |
| 2006/0200460 A1 | 9/2006 | Meyerzon et al. |
| 2006/0200461 A1 | 9/2006 | Lucas et al. |
| 2006/0206586 A1 | 9/2006 | Ling et al. |
| 2006/0271630 A1* | 11/2006 | Bensky et al. ................ 709/206 |
| 2006/0276170 A1 | 12/2006 | Radhakrishnan et al. |
| 2006/0276213 A1 | 12/2006 | Gottschalk et al. |
| 2006/0282328 A1 | 12/2006 | Gerace et al. |
| 2006/0286963 A1 | 12/2006 | Koskinen et al. |
| 2006/0286964 A1 | 12/2006 | Polanski et al. |
| 2006/0288124 A1 | 12/2006 | Kraft et al. |
| 2007/0004333 A1 | 1/2007 | Kavanti |
| 2007/0011344 A1 | 1/2007 | Paka et al. |
| 2007/0016743 A1 | 1/2007 | Jevans |
| 2007/0022021 A1 | 1/2007 | Walker et al. |
| 2007/0027703 A1 | 2/2007 | Hu et al. |
| 2007/0027760 A1 | 2/2007 | Collins et al. |
| 2007/0027762 A1 | 2/2007 | Collins et al. |
| 2007/0037562 A1 | 2/2007 | Smith-Kerker et al. |
| 2007/0047523 A1 | 3/2007 | Jiang |
| 2007/0061195 A1 | 3/2007 | Liu et al. |
| 2007/0061300 A1 | 3/2007 | Ramer et al. |
| 2007/0072631 A1 | 3/2007 | Mock et al. |
| 2007/0074262 A1 | 3/2007 | Kikkoji et al. |
| 2007/0083602 A1 | 4/2007 | Heggenhougen et al. |
| 2007/0088687 A1 | 4/2007 | Bromm et al. |
| 2007/0088801 A1 | 4/2007 | Levkovitz et al. |
| 2007/0088851 A1* | 4/2007 | Levkovitz et al. ............ 709/246 |
| 2007/0094066 A1 | 4/2007 | Kumar et al. |
| 2007/0100651 A1 | 5/2007 | Ramer et al. |
| 2007/0100805 A1 | 5/2007 | Ramer et al. |
| 2007/0105536 A1 | 5/2007 | Tingo, Jr. |
| 2007/0113243 A1 | 5/2007 | Brey |
| 2007/0117571 A1 | 5/2007 | Musial |
| 2007/0118592 A1 | 5/2007 | Bachenberg |
| 2007/0136457 A1 | 6/2007 | Dai et al. |
| 2007/0149208 A1 | 6/2007 | Syrbe et al. |
| 2007/0180147 A1 | 8/2007 | Leigh |
| 2007/0192409 A1 | 8/2007 | Kleinstern et al. |
| 2007/0198485 A1 | 8/2007 | Ramer et al. |
| 2007/0214470 A1 | 9/2007 | Glasgow et al. |

| | | | | | | |
|---|---|---|---|---|---|---|
| 2007/0233671 | A1 | 10/2007 | Oztekin et al. | JP | 2007087138 | 4/2007 |
| 2007/0260624 | A1 | 11/2007 | Chung et al. | JP | 2007199821 | 8/2007 |
| 2007/0288950 | A1 | 12/2007 | Downey et al. | KR | 20060011760 | 7/2004 |
| 2007/0290787 | A1 | 12/2007 | Fiatal et al. | WO | 96/24213 | 8/1996 |
| 2008/0004046 | A1 | 1/2008 | Mumick et al. | WO | 98/21713 | 5/1998 |
| 2008/0013537 | A1 | 1/2008 | Dewey et al. | WO | 00/00916 | 1/2000 |
| 2008/0032717 | A1 | 2/2008 | Sawada et al. | WO | 00/30002 | 5/2000 |
| 2008/0032793 | A1 | 2/2008 | Yoshizawa | WO | 00/44151 | 7/2000 |
| 2008/0052158 | A1 | 2/2008 | Ferro et al. | WO | 01/22748 | 3/2001 |
| 2008/0065491 | A1 | 3/2008 | Bakman | WO | 01/31497 | 5/2001 |
| 2008/0070579 | A1 | 3/2008 | Kankar et al. | WO | 01/44977 | 6/2001 |
| 2008/0071875 | A1 | 3/2008 | Koff et al. | WO | 01/52161 | 7/2001 |
| 2008/0071929 | A1 | 3/2008 | Motte et al. | WO | 01/57705 | 8/2001 |
| 2008/0082686 | A1 | 4/2008 | Schmidt et al. | WO | 01/58178 | 8/2001 |
| 2008/0091796 | A1 | 4/2008 | Story | WO | 01/63423 | 8/2001 |
| 2008/0133344 | A1 | 6/2008 | Hyder et al. | WO | 01/65411 | 9/2001 |
| 2008/0140508 | A1 | 6/2008 | Anand et al. | WO | 01/69406 | 9/2001 |
| 2008/0228568 | A1 | 9/2008 | Williams et al. | WO | 01/71949 | 9/2001 |
| 2008/0243619 | A1 | 10/2008 | Sharman et al. | WO | 01/72063 | 9/2001 |
| 2008/0249832 | A1 | 10/2008 | Richardson et al. | WO | 01/91400 | 11/2001 |
| 2008/0271068 | A1 | 10/2008 | Ou et al. | WO | 01/93551 | 12/2001 |
| 2008/0281606 | A1 | 11/2008 | Kitts et al. | WO | 01/97539 | 12/2001 |
| 2008/0288476 | A1 | 11/2008 | Kim et al. | WO | 02/09431 | 1/2002 |
| 2008/0319836 | A1 | 12/2008 | Aaltonen et al. | WO | 02/31624 | 4/2002 |
| 2009/0006194 | A1 | 1/2009 | Sridharan et al. | WO | 02/44989 | 6/2002 |
| 2009/0029721 | A1 | 1/2009 | Doraswamy | WO | 02/054803 | 7/2002 |
| 2009/0049090 | A1 | 2/2009 | Shenfield et al. | WO | 02/069585 | 9/2002 |
| 2009/0063249 | A1 | 3/2009 | Tomlin et al. | WO | 02/069651 | 9/2002 |
| 2009/0106111 | A1 | 4/2009 | Walk et al. | WO | 02/075574 | 9/2002 |
| 2009/0125377 | A1 | 5/2009 | Somji et al. | WO | 02/084895 | 10/2002 |
| 2009/0132395 | A1 | 5/2009 | Lam et al. | WO | 02/086664 | 10/2002 |
| 2009/0138304 | A1 | 5/2009 | Aharoni et al. | WO | 02/096056 | 11/2002 |
| 2009/0197619 | A1 | 8/2009 | Colligan et al. | WO | 03/015430 | 2/2003 |
| 2009/0216847 | A1 | 8/2009 | Krishnaswamy et al. | WO | 03/019845 | 3/2003 |
| 2009/0240677 | A1 | 9/2009 | Parekh et al. | WO | 03/024136 | 3/2003 |
| 2009/0275315 | A1 | 11/2009 | Alston | WO | 03/049461 | 6/2003 |
| 2009/0286520 | A1 | 11/2009 | Nielsen et al. | WO | 03/088690 | 10/2003 |
| 2009/0298483 | A1 | 12/2009 | Bratu et al. | WO | 2004/084532 | 9/2004 |
| 2010/0030647 | A1 | 2/2010 | Shahshahani | WO | 2004/086791 | 10/2004 |
| 2010/0082397 | A1 | 4/2010 | Blegen | WO | 2004/100470 | 11/2004 |
| 2010/0082423 | A1 | 4/2010 | Nag et al. | WO | 2004/100521 | 11/2004 |
| 2010/0088152 | A1 | 4/2010 | Bennett | WO | 2004/102993 | 11/2004 |
| 2010/0114654 | A1 | 5/2010 | Lukose et al. | WO | 2004/104815 | 12/2004 |
| 2010/0125505 | A1 | 5/2010 | Puttaswamy | WO | 2005/020578 | 3/2005 |
| 2010/0138271 | A1 | 6/2010 | Henkin | WO | 2005/029769 | 3/2005 |
| 2010/0161424 | A1 | 6/2010 | Sylvain | WO | 2005/073863 | 8/2005 |
| 2010/0169157 | A1 | 7/2010 | Muhonen et al. | WO | 2005/076650 | 8/2005 |
| 2010/0169176 | A1 | 7/2010 | Turakhia | WO | 2006/002869 | 1/2006 |
| 2011/0106840 | A1 | 5/2011 | Barrett et al. | WO | WO 2006/005001 | 1/2006 |
| 2011/0209067 | A1 | 8/2011 | Bogess et al. | WO | 2006/016189 | 2/2006 |
| 2011/0276401 | A1 | 11/2011 | Knowles et al. | WO | 2006/024003 | 3/2006 |
| | | | | WO | 2006/027407 | 3/2006 |
| | | FOREIGN PATENT DOCUMENTS | | WO | 2006/040749 | 4/2006 |
| DE | | 10061984 | 6/2002 | WO | 2006/093284 | 9/2006 |
| EP | | 1061465 | 12/2000 | WO | 2006/119481 | 11/2006 |
| EP | | 1073293 | 1/2001 | WO | 2007/001118 | 1/2007 |
| EP | | 1107137 | 6/2001 | WO | 2007/002025 | 1/2007 |
| EP | | 1109371 | 6/2001 | WO | 2007/060451 | 5/2007 |
| EP | | 1220132 | 7/2002 | WO | 2007/091089 | 8/2007 |
| EP | | 1239392 | 9/2002 | WO | 2007/103263 | 9/2007 |
| EP | | 1280087 | 1/2003 | WO | 2008/013437 | 1/2008 |
| EP | | 1365604 | 11/2003 | WO | 2008/024852 | 2/2008 |
| EP | | 1408705 | 4/2004 | WO | WO 2008/045867 | 4/2008 |
| EP | | 1455511 | 9/2004 | WO | WO 2008/147919 | 4/2008 |
| EP | | 1509024 | 2/2005 | WO | 2009/009507 | 1/2009 |
| EP | | 1528827 | 5/2005 | WO | 2009/077888 | 1/2009 |
| EP | | 1542482 | 6/2005 | WO | 2009/032856 | 3/2009 |
| EP | | 1587332 | 10/2005 | WO | 2009/061914 | 5/2009 |
| EP | | 1633100 | 3/2006 | WO | 2009/099876 | 8/2009 |
| EP | | 1677475 | 7/2006 | WO | 2009/158097 | 12/2009 |
| EP | | 1615455 | 11/2006 | | | |
| EP | | 1772822 | 4/2007 | | OTHER PUBLICATIONS | |
| GB | | 2343051 | 4/2000 | | | |
| GB | | 2369218 | 5/2002 | | | |
| GB | | 2372867 | 9/2002 | | | |
| GB | | 2406996 | 4/2005 | | | |
| GB | | 2414621 | 11/2005 | | | |
| GB | | 2424546 | 9/2006 | | | |
| JP | | 2002140272 | 5/2002 | | | |

OTHER PUBLICATIONS

Combined Search and Examination Report dated Mar. 7, 2008 for United Kingdom Patent Application No. GB 0721863.9.

Examination Report dated Nov. 9, 2009 for European Patent Application No. EP 08159355.0.

"Advertisement System, Method and Computer Program Product", IP.com Prior Art Database Disclosure, Pub No. IPCOM000138557D, dated Jul. 24, 2006, IP.com, Amherst, NY (Available online at http://priorartdatabase.com/IPCOM/000138557, last visited Aug. 30, 2010)., Jul. 24, 2006.

"Communication (Combined Search and Examination Report under Sections 17 and 18(3)) dated Jan. 30, 2009 issued from the United Kingdom Patent Office", in related United Kingdom Application No. GB 0818145.5 (8 pages), Jan. 30, 2009.

"Communication (European Search Report) dated Jun. 26, 2008", in European Patent Application No. EP 08101394, Jun. 26, 2008.

"Communication (European Search Report) dated Oct. 17, 2008 issued by the European Patent Office", in counterpart European Patent Application EP 08156763, Oct. 17, 2008.

"Communication (International Search Report along with Written Opinion of International Searching Authority) mailed Oct. 8, 2008 issued by the International Searching Authority", in counterpart International Application PCT/EP 2008/056342, Oct. 8, 2008.

"Communication (Notification Concerning Transmittal of International Preliminary Report on Patentability, International Preliminary Report on Patentability, and Written Opinion of the International Searching Authority)", issued in connection with related International Application PCT/EP 2008/051489 and mailed on Sep. 24, 2009 (6 pages), Sep. 24, 2009.

"Communication (Search Report under Section 17 along with Examination Report under Section 18(3)) dated Oct. 6, 2008 issued by the United Kingdom Intellectual Property Office", in counterpart U.K. Application GB 0809321.3, Oct. 6, 2008.

"Communication Pursuant to Article 94(3) EPC (European Examination Report) dated Oct. 23, 2008", issued in counterpart European Patent Application No. EP 08101394.8-1238, Oct. 23, 2008.

"Examination Report", for counterpart European Patent Applicaiton No. 08153257.4 issued Jun. 2, 2009.

"Examination Report dated Jun. 17, 2009", issued in counterpart U.K. Application No. GB 0803273.2 by U.K. Intellectual Property Office (4 pages).

"International Preliminary Report on Patentability and Written Opinion issued Nov. 24, 2009", in International Application PCT/EP 2008/056342 (1 page), Nov. 24, 2009.

"International Search Report", for International Application No. PCT/FI 2006/050455, dated Jul. 25, 2007.

"International Search Report and Written Opinion mailed on Aug. 26, 2011", for PCT/US 2011/034927 titled "Content Delivery Based on User Terminal Events," to Apple Inc., Aug. 26, 2011.

"International Search Report and Written Opinion of the International Search Authority mailed Jun. 19, 2009", for International Application No. PCT/EP 2008/056069, Jun. 19, 2009.

"International Search Report and Written Opinion of the International Searching Authority mailed Feb. 11, 2009, issued by the International Searching Authority", in related International Application PCT/EP 2008/063839 (11 pages).

"International Search Report mailed Mar. 24, 2009", in related PCT International Application No. PCT/EP 2008/063326 (4 pages), Mar. 24, 2009.

"Notice of Allowance dated Apr. 29, 2011", U.S. Appl. No. 11/888,680, filed Apr. 29, 2011, 13 pages.

"Office Action dated Mar. 31, 2011 issue by the U.S. Patent Office", in related U.S. Appl. No. 12/080,124 (29 pages), Mar. 31, 2011.

"Office Action issued from the USPTO dated Aug. 20, 2009", issued in related U.S. Appl. No. 12/075,593 (14 pages), Aug. 20, 2009.

"Office Action issued Mar. 17, 2010", in related U.S. Appl. No. 12/075,593 (11 pages), Mar. 17, 2010.

"Office Action Issued Oct. 15, 2010 by the U.S. Patent Office", in related U.S. Appl. No. 12/080,124 (28 pages), Oct. 15, 2010.

"Search Report under Section 17 dated Jul. 7, 2008", in related U.K. Application GB 0803273.2.

"U.K. Search Report under Section 17 dated Oct. 23, 2007", in U.K. Application No. 0712280.7, Oct. 23, 2007.

"Written Opinion of the International Searching Authority mailed Mar. 24, 2009 issued from the International Searching Authority", in related PCT International Application No. PCT/EP 2008/063326 (5 pages), Mar. 24, 2009.

"XP002456252—Statement in Accordance with the Notice from the European Patent Office dated Oct. 1, 2007", concerning business. methods (OJ Nov. 2007; p. 592-593), Nov. 1, 2007, 592-593.

Hillard, Dustin et al., "Improving Ad Relevance in Sponsored Search", Proceedings of the third ACM international conference on Web search and data mining, WSDM'10, Feb. 4-6, 2010, Session: Ads, pp. 361-369, ACM, New York, New York, USA, 2010., Feb. 4, 2010, 361-369.

Internet Reference, "Specific Media Behavioral Targeting Index", Specific Media, Inc., Irvine, CA, 2010, Available online at http://www.specificmedia.com/behavioral-targeting.php.

Langheinrich, Marc et al., "Unintrusive Customization Techniques for Web Advertising", Computer Networks: The International Journal of Computer and Telecommunications Networking, vol. 31, No. 11, May 1999, pp. 1259-1272, Elsevier North-Holland, Inc., New York, NY, 1999., May 11, 1999, 1259-1272.

Mueller, Milton , "Telecommunication Access in Age of Electronic Commerce: Toward a Third-Generation Service Policy", Nov. 1996, HeinOnline, 49. Fed. Comm L.J., Nov. 1, 1996, 655-665.

Perkins, Ed , "When to buy airfare", http://www.smartertrael.com/travel-advice/when-to-buy-airfare.html?id=1628038, Nov. 21, 2006 (4 pages), Nov. 21, 2006.

Regelson, Moira et al., "Predicting Click-Through Rate Using Keyword Clusters", Proceedings of the Second Workshop on Sponsored Search Auctions, EC'06, SSA2, Jun. 11, 2006, ACM, 2006., Jun. 11, 2006.

Richardson, Matthew et al., "Predicting Clicks: Estimating the Click-Through Rate for New Ads", Proceedings of the 16th international conference on World Wide Web, Banff, Alberta, Canada, May 8-12, 2007, Session: Advertisements & click estimates, pp. 521-529, ACM, 2007., May 8, 2007, 521-529.

Shaikh, Baber M. et al., "Customized User Segments for Ad Targeting", IP.com Prior Art Database Disclosure, Pub No. IPCOM000185640D, dated Jul. 29, 2009 UTC, IP.com, Amherst, NY (Available online at http://priorartdatabase.com/IPCOM/000185640, last visited Aug. 30, 2010)., Jul. 29, 2009.

"AdWords Reference Guide", Google, 2004.

Ghose, Anindya et al., "An Empirical Analysis of Search Engine Advertising: Sponsored Search in Electronic Markets", Management Science, Informs, 2009.

Karuga, Gilber G. et al., "AdPalette: An Algorithm for Customizing Online Advertisements on the Fly", Decision Support Systems, vol. 32, 2001.

* cited by examiner

| Message # | Subscriber A | Advertising Content | Subscriber B |
|---|---|---|---|
| 1 | Movie tonight? | "www.movies.com" | |
| 2 | | "Die Hard 7 now in theatres" | What's going? |
| 3 | Heard that new Fox is good | "Back to the Future 15 now in theatres" | |
| 4 | | "50% discount today in Movie Theatre XYZ. Reserve +4412345678" | Sounds good. Where should we go? |
| 5 | How about Movie Theatre XYZ? | "50% discount today in Movie Theatre XYZ. Reserve +4412345678" | |
| 6 | | "Snacks for movie night from Snacks Heaven" | Ok. See you there at 9 |
| 7 | Ok | "Snacks for movie night from Snacks Heaven" | |

FIGURE 6

| Message # | Subscriber A | Advertising Content | Subscriber B |
|---|---|---|---|
| 1' | Movie tonight? | "www.movies.com" | |
| 2' | | "Die Hard 7 now in theatres" | What's going? |
| 3' | Heard that new Fox is good | "Back to the Future 15 now in theatres" | |
| 4' | | "Movie Theatre XYZ now opened." | Sounds good. Where should we go? |
| 5' | How about Movie Theatre XYZ? | "Movie Theatre XYZ now opened." | |
| 6' | | "Discounted movie tickets from +4412345678" | Ok. U reserve tickets? |
| 7' | Will do. See u at 9 | "Snacks for movie night from Snacks Heaven" | |

FIGURE 7

SYSTEMS, METHODS, NETWORK ELEMENTS AND APPLICATIONS FOR MODIFYING MESSAGES

The invention relates in general to methods, systems and software for monitoring of communication dialogs or sessions between a plurality of users or a user and a service provider, thereby enabling management, delivery and assessment of information content deemed relevant to the users.

BACKGROUND OF THE INVENTION

The overwhelming popularity of mobile devices such as cellular phones has opened up the possibility of using mobile devices and related communication infrastructure as a media for providing what may be referred to as "mobile marketing" to potential consumers. Mobile marketing involves and relates to marketing and advertising via mobile devices, e.g., mobile phones, smart phones, and Personal Data Assistants (PDAs), or any other computer device configured to be able to receive or send data wirelessly, receiving advertising content, i.e., marketing and/or advertising content in the form of, e.g., text, audio, video or some combination thereof associated with a particular product, service or combination thereof.

Mobile marketing is considered by advertisers as the next new channel to directly reach potential consumers. Mobile marketing enables advertisers to directly reach individual consumers in a targeted way. This is because the nature of mobile media is personal, in that mobile devices are generally used by a particular individual rather than a group of individuals. Further, mobile media is, by definition, mobile, which offers a transportable mechanism for exposing potential consumers to advertising content. Moreover, because mobile media is "always on," advertisers are not constrained by the need to make a connection in order to deliver advertising content to a user's device because a connection is always established with a user's mobile device (provided the mobile device is in range of an available communication network). As an additional benefit of mobile media as an advertising mechanism, mobile media enables groups of individuals to form wherein the group members communicate actively with each other. As a result, these characteristics combined with social networks—based marketing approach of the Internet may form a very powerful base to execute marketing strategies.

A conventional advertising approach in the field of Internet advertising is contextual advertising that utilizes a service branded as AdSense™ offered by Google™. AdSense™ enables adding relevant advertisements to web sites in such a way that advertising content is displayed such that there is some correlation between the content of the web site being displayed and advertising content displayed in advertising sections, e.g., banners, pop ups, etc., of a displayed page of the website. For example, if webpage content pertains to travel, the service may display advertising content pertinent to the area, e.g., hotels, attractions, etc.

Further, various conventional Internet services, e.g., readers such as Gmail.com, provide the ability to insert a tag or additional information when a user sends an electronic mail message based on the content of the e-mail.

Conventional mobile marketing techniques also involve identifying, also known as "tagging," of message communication between particular users, i.e., point-to-point communication (see, for example, U.S. Patent Pub. 20060194595 and entitled "Messaging Service and System"). However, one problem in marketing via mobile communication is messages such as text messages are typically short, e.g., Short Message Service (SMS) messages. Additionally, such messages do not typically have previous messages as a part of a new message. As a result, it is challenging to effectively identify relevant advertising or marketing content to accompany a message to be sent or a message to be received.

SUMMARY OF THE INVENTION

In accordance with at least one embodiment of the invention, methodologies and mechanisms are provided that enable the monitoring of communication dialogs or sessions between a plurality of users or a user and a content service and a determination of content to be added to current and/or future messages sent in the communication dialog(s) or session(s) based on content of one or more previously sent messages, as specified in the independent claims. This is achieved by a combination of features recited in each independent claim. Accordingly, dependent claims prescribe further detailed implementations of the present invention.

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to the more detailed description below.

In the following description of various invention embodiments, reference is made to the accompanying drawings, which form a part hereof, and in which is shown, by way of illustration, various embodiments in which the invention may be practiced. It is to be understood that other embodiments may be utilized and structural and functional modifications may be made without departing from the scope and spirit of the present invention.

BRIEF DESCRIPTION OF THE DRAWINGS

A more compete understanding of the present invention and the utility thereof may be acquired by referring to the following description in consideration of the accompanying drawings, in which like reference numbers indicate like features, and wherein:

FIG. 6 illustrates one example of a communication dialog or session identified by at least one embodiment of the invention.

FIG. 7 illustrates another example of a communication dialog or session identified by at least one embodiment of the invention.

DETAILED DESCRIPTION OF THE INVENTION

Figure 1:
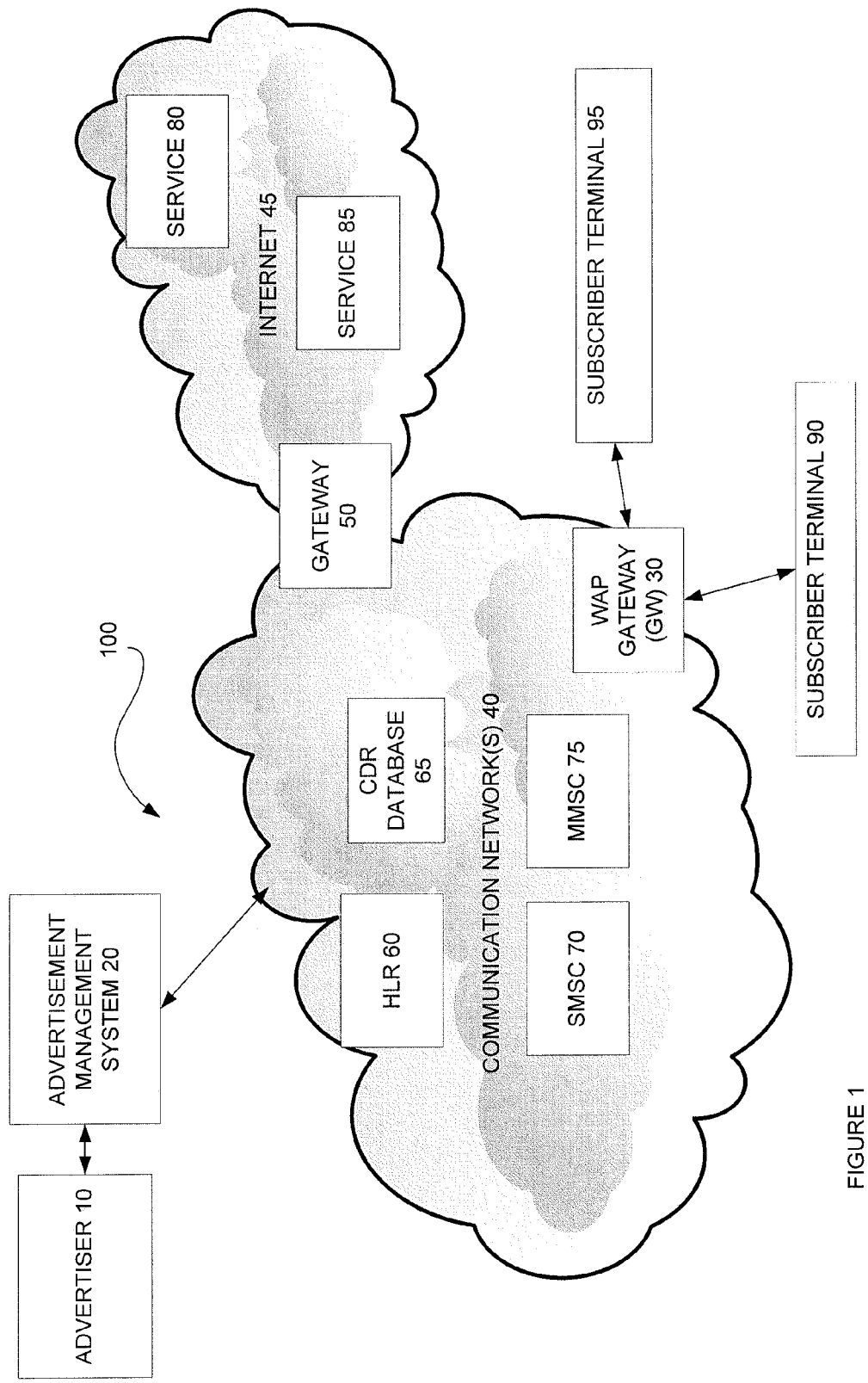
FIG. 1 illustrates an advertising environment wherein embodiments of the invention may be utilized.

In general, mobile marketing and advertising activities can be divided into four categories: mobile Customer Relation Management (CRM), mobile marketing, mobile advertising, and mobile direct advertising. Mobile CRM involves a combination mobile advertising, mobile marketing and mobile direct marking (each explained herein) in a manner that establishes a long-term, engaging relationship between the customer and the promoting company.

Mobile marketing involves the systematic planning, implementation and control of a mix of business activities intended to bring together buyers and sellers for the mutually advantageous exchange or transfer of products or services where the primary point of contact with the potential consumer is via their mobile device. To the contrary, mobile advertising may be thought of more narrowly as the paid, public, non-personal announcement of a persuasive message by an identified sponsor (i.e., an advertiser), the non-personal presentation or promotion by a firm of its products to its existing and potential customers where such communication is delivered to a mobile phone or other mobile device. Examples of mobile advertising would include: Wireless Application Protocol (WAP) and Web banner advertisements, mobile search advertising, mobile video bumpers, and interstitial advertisements.

Mobile direct marketing differs from mobile marketing typically in that direct marketing involves advertising content being delivered to a mobile device on an individual basis. Accordingly, examples of mobile direct marketing include the sending of Short Messaging Service (SMS), Enhanced Messaging Service (EMS), Multimedia Messaging Service (MMS) or WAP push messages, Bluetooth messaging and other marketing to mobile devices.

Such direct marketing often uses text and picture messaging. MMS, also known as picture messaging, is a widely used service with mobile phone users. Picture messaging refers to the sending of an image, e.g., a photograph produced by a mobile phone, to another mobile phone or to a server or electronic-mail account. Conventionally, the images are sent in some predetermined picture format, e.g., Joint Picture Expert Group (JPEG). In addition to pictures, MMS messages might compose of video, audio, hypertext, links, etc.

One fairly recent type of advertising is contextual advertising, which involves advertising that is targeted to the specific individual who is being exposed to the advertising. For example, contextual advertising on the Internet provides advertising content on a web page that also provides non-advertising related content of interest to the web page reader; thus, conventional contextual advertising techniques may provide advertising content on airline ticket prices on a web site relating to remote travel destinations. Thus, Internet related contextual advertising relies on a presumption that a visitor of a web site is interested in the non-advertising material provided by the web site and, as a result, would also be interested in or susceptible to advertising regarding service and/or products related to that non-advertising material. Accordingly, Internet-related contextual advertising systems scan the text of a Web site for keywords and return advertising content to the Web page based on what the visitor is viewing, either through advertising content placed on the web page or pop-up advertisements. Contextual advertising is also used by search engines to display ads on their search results pages based on what word(s) the user has searched for.

However, a problem in implementing contextual advertising in mobile, text based environment, such as SMS is that the brief and truncated nature of text messages results in an inability to recognize what advertising content is appropriate to provide to communication session participants. For example, in the area of linguistics (i.e., the scientific study of language), text messages suffer from what are referred to as endophoras.

Endophoras are terms that co-refer to other descriptions in a disclosure. A cataphora is a type of endophora and is a term used to describe an expression that co-refers with a later expression in the discourse. That is to say, the earlier expression refers to or describes a forward expression. For example, given: "Finding the right trinket was a real hassle. I finally settled on an MP3 player." The term "trinket" (generally referring to a small article of equipment) is an instance of cataphora because it refers to "an MP3 player," an object that hasn't been mentioned in the discourse prior to that point. To the contrary, an anaphora (which is also a type of endophora), is a reference forward in the discourse (e.g., "We saw that movie. It was good if you like horror flicks."). In this example, the term "movie" is an anaphora for the term "it" in the second sentence.

Thus, contextual advertising is difficult because of the brief nature of text messages (i.e., short messages) and users' propensity to use alternative terms and truncate certain terms in dialog ("Let's see a show?" "How about a horror movie?" "I don't like flicks like that!" "What else do you want to see?")

Thus, in accordance with at least one embodiment of the invention, methodologies and mechanisms are provided that enable the monitoring of communication dialogs between a plurality of users or a user and a content service and a determination of content to be added to current and/or future messages sent in the communication dialog based on content of one or more previous messages sent.

With this understanding of one area of the utility of embodiments of the invention in mind, a description of the architecture and operation of various invention embodiments is now provided. FIG. 1 illustrates an advertising environment wherein embodiments of the invention may be utilized. Embodiments of the invention may be utilized in environment 100 to provide contextual advertising services for reaching text messaging mobile device users. For example, the advertising environment 100 may include one or more networks enabling free or subsidized phone services in exchange for subscribers viewing a number of targeted advertisements that are relevant to the subscriber.

As illustrated in FIG. 1, an advertiser 10 (which may be an advertiser, advertising firm, media agency, operator, consultancy company or other similar entity interested in implementing, managing or determining the efficacy of a marketing or advertising campaign) may access the advertisement management system 20 (illustrated in further detail in FIG. 2) in order to manage and control distribution of advertising content in connection with one or more marketing or advertising campaigns.

The advertiser 10 may reserve, program, and/or book an advertisement campaign via a user interface (explained further with reference to FIG. 2 and implemented as, for example, a web interface) for advertisement management system 20. Further, the advertiser 10 may also define a set of keywords related to delivering advertising content to communication sessions between a plurality of users (via mobile devices 90, 95) and/or a particular user(s) and one or more content services 80. The term "communication session" should be construed to include but is not limited to one or more communication messages being exchanged between a plurality of subscribers or a subscriber and a service provider co-referring to at least one particular topic.

As part of that advertising campaign, advertising content is distributed to a plurality of subscriber terminals, which may be, for example, mobile devices or other devices capable of sending and receiving text messages and outputting such messages the device users. The advertising content may include information in form of data, text, pictures, audio, video, HyperText Markup Language (HTML), eXtensible Markup Language (XML), eXtensible HyperText Markup Language (XHTML) to Advertisement Management System (AMS) 20. The advertiser 10 may also indicate instructions and/or rules indicating when and how to send advertising content, details regarding which users should receive advertising content (e.g., characteristics of device users included in a target group or groups for the advertising campaign), in which format (e.g., SMS, MMS, WAP Push, Web pages, digital object, etc.), a target price level for the advertising campaign, demographics of the target audience, duration of the advertisement campaign, etc.

Figure 2:
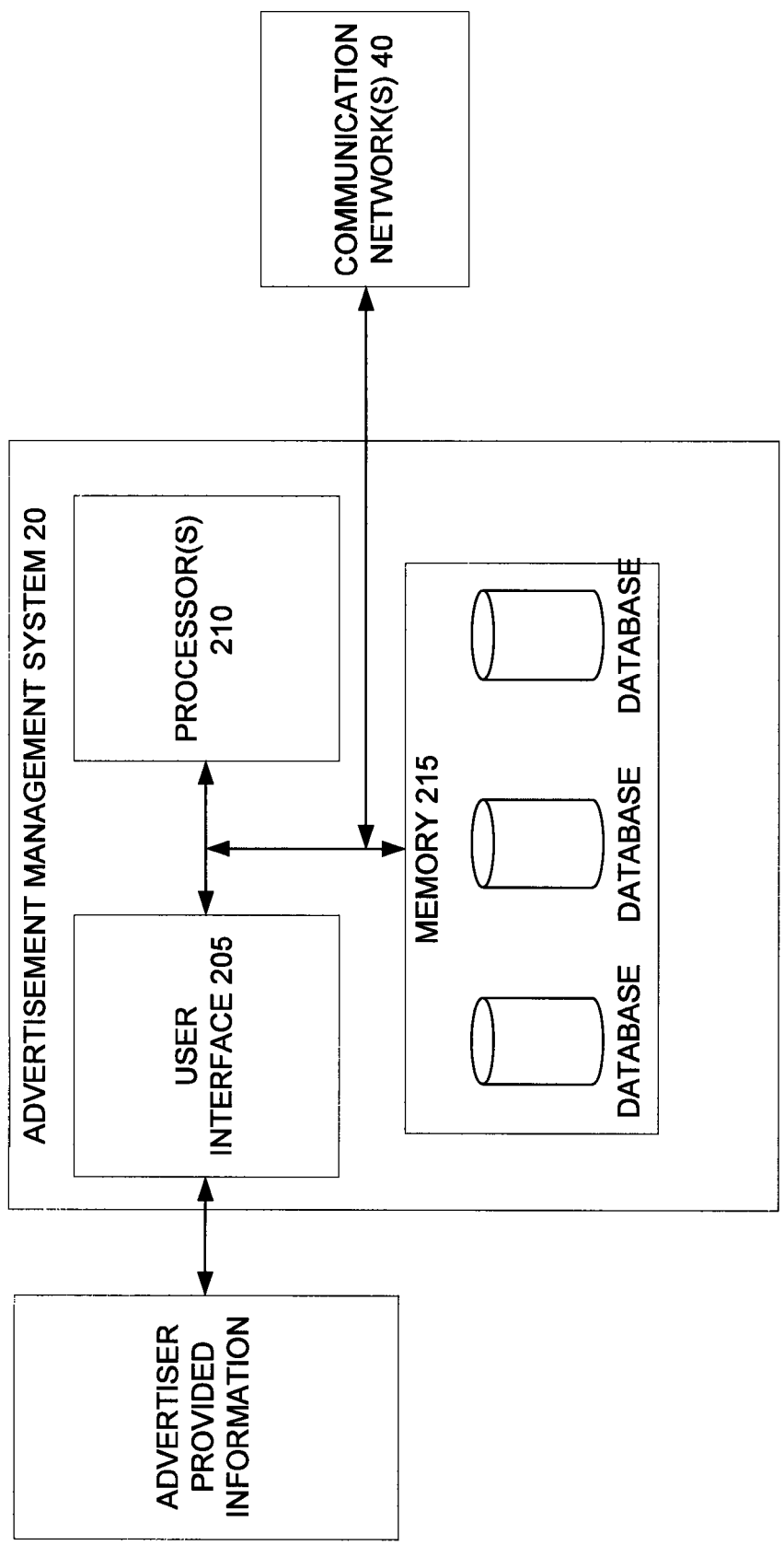
FIG. 2 illustrates additional details included in an advertisement management system provided in accordance with at least one embodiment of the invention.

The Advertisement Management System (AMS) 20 can be operationally coupled to the communication network(s) 40. FIG. 2 illustrates the AMS 20 in more detail. In accordance with at least one embodiment of the invention, there can be an auction type of system in the AMS 20 configured to allocate advertising content and messages to be sent to consumers. Preferences, settings, advertisement content, advertisements, messages, texts, Figures, keywords and/or other rules of sending and tagging communication sessions may be stored in memory 215.

Advertising content may be commercial, e.g., product or service promotion or non-commercial messages such as general information services.

The communication network(s) 40 may also include one or more network elements, e.g., Home Location Register (HLR) 60, Call Detail Records (CDR) 65, Short Message Service Center (SMSC) 70, Multimedia Message Service Center (MMSC) 75, Wireless Application Protocol GateWay (WAPGW) 30, and GateWay 50. Additionally, the communication network(s) 40 may include or be implemented to communicate with various additional components, e.g., a billing system (not shown), base stations (not shown) and other elements, interfaces and functions conventionally understood to be of use in the operation and provision of a communication network(s).

Moreover, communication network 40 may be implemented as, include or be connected or coupled to the Internet 45 via gateway 50 to provide access to services 80, 85. Such services may include information, products, subscription services, etc.

As illustrated in FIG. 1, the network(s) 40 may include or be configured to provide communication functionality with a plurality of subscriber terminals 90, 95 corresponding respectively to A and B subscribers. Subscriber terminals may be connected or coupled to communication network(s) 40 via, for example, one or more base stations (not shown). Additionally, depending on a type of communication, a communication session between a plurality of subscriber terminals or a subscriber terminal and another entity may utilize elements, for example, network elements such as WAP Gateway 30 for WAP browsing or use packet radio connections in form of General Purpose Radio Service (GPRS) to access Internet 45 and Internet Services 80, 85 via for example GateWay 50. Internet service may, for example, provide access using a web browser in, e.g., a subscriber terminal and Internet Protocol connection. Typically, Short Message Service (SMS) may be configured using a Short Messaging Service Client (SMSC) and/or Multimedia Message Services using Multimedia Messaging Service Client (MMSC) network elements, for example.

The one or more communication networks 40 may include any type of communications network including but not limited to a second Generation (2G) network, a 2.5 Generation network, a third Generation (3G) network utilizing Global System for Mobile Communications (GSM), Wideband Code Division Multiplex Access (WCDMA), Code Division Multiplex Access (CDMA), or Time Division Multiplex Access (TDMA), General Packet Radio Services (GPRS), Universal Mobile Telephone System (UMTS). Network(s) 40 can also be implemented as a combination of two or more technologies i.e., a hybrid network. Further, communication network(s) 40 may also include generic Internet access using any transport methods.

Further, the one or more communication networks 40 may also include local area networks, such as Wireless Local Area Networks (WLAN), BlueTooth (BT) and optionally utilize one or more other technologies, such as WiMax (WorldwideInteroperability for Microwave Access). Communication via the one or more communication networks 40 may be implemented by broadcasting over cellular, broadcasting over DVB-H (Digital Video Broadcasting—Handhelds), ISDB-T (Terrestrial Integrated Services Digital Broadcasting) or DMB (Digital Multimedia Broadcasting). Further, optionally, MediaFlo™ may be used to provide a connection and to deliver a service.

The one or more communication networks 40 can also include any other type of network of interconnected devices or device networks, e.g., interconnected computers or computer networks. Accordingly, it should be understood that the one or more communication networks 40 can also be a combination of a plurality of different types of networks forming one or more hybrid networks.

The one or more communication networks 40 may include one or more Short Message Service Centers (SMSC) 70 and/or Multimedia Message Service Centers 75 and/or include the functionality thereof in either a centralized or distributed manner. Accordingly, the one or more communication networks 40 may enable transmission of SMS and MMS messages.

The one or more communication networks 40 may further include one or more base stations or wireless communications station (not shown) installed at fixed locations and used to communicate as part of either a push-to-talk two-way radio system or a wireless telephone system, for example, cellular, CDMA or GSM.

The one or more communication networks 40 may also provide operational coupling between a billing system (not shown) and the WAP GW 20 or directly with the AMS 20. It should be understood that the billing system may be configured to receive information pertaining to the delivery of advertising content to device users, responses to the advertising content and to formulate billing to advertisers for the delivery and resulting actions performed by the users exposed to the advertising content.

Once an advertiser has provided data indicating how advertising content is to be distributed (e.g., the content and format of the advertising content) in connection with a marketing and/or advertising campaign, the information may be used to deliver the advertising content via the one or more communication networks 40 to one or more subscriber terminals (as explained in greater detail in connection with FIG. 2).

Each of the subscriber terminals 90, 95 can be implemented as a mobile phone, lap top, PDA, multimedia computer, smart phone, etc. Accordingly, although not illustrated, it should be understood that a subscriber terminal 90, 95 may include a processor connected to a user interface, computer readable memory and/or other data storage and a display and/or other output device. The subscriber terminal may also include a battery, speaker and at least one antenna. The user interface may further include a keypad, touch screen, voice interface, one or more arrow keys, joy-stick, data glove, mouse, roller ball, touch screen or the like.

Accordingly, computer executable instructions and data used by a processor included in a subscriber terminal 90, 95 and other components within the mobile device may be stored in the computer readable memory included the subscriber terminal. Further, the memory may be implemented with any combination of read only memory modules or random access memory modules, optionally including both volatile and non-volatile memory. Further, software may be stored within the memory and/or storage to provide instructions to the subscriber terminal's processor for enabling the mobile device to perform various functions. Alternatively, some or all of the device computer executable instructions may be embodied in hardware or firmware (not illustrated).

Terminals 90, 95 may have capability to communicate with one or more different types of communication networks and have messaging capabilities including, e.g., a Short Message Service (SMS) client, electronic mail client or Multimedia Message Service client embedded in the terminal. Terminals 90, 95 may also include a browser (not shown) configured to access Web and/or Wireless Application Protocol (WAP) services.

The CDR database 65 may be implemented either as a stand alone, standard or specialized communication network element or its functionality may be implemented in whole or in part in AMS 20. Each CDR may contain information specific to the corresponding message, e.g., time of sending the message, the message sender and receiver ID (such as a Mobile Station Integrated Services Digital Network (MSISDN) or International Mobile Subscriber Identity (IMSI). The content of one or more related messages may also be stored in memory 215 included in the AMS 20 (as illustrated in FIG. 2) and/or the CDR database 65.

As illustrated in FIG. 2, the Advertisement Management System (AMS) 20 may include one or more processors 210 operationally coupled to a user interface 205, computer readable memory and/or other data storage 215. Accordingly, computer executable instructions and data used by the processor(s) 210 and other components within the AMS 20 may be stored in the computer readable memory included the AMS 20. Further, software may be stored within the memory and/or storage 215 (coupled to the processor(s) 210 and user interface 205) to provide instructions to the AMS components for enabling the system 20 to perform various functions.

For example, the AMS 20 may be configured to receive advertising content and/or information indicating the content of the advertising content (e.g., audio, video, text, graphics, font type, font color, etc.) and format of the advertising content (e.g., MMS, EMS, SMS, WAP push, etc.) associated with marketing and/or advertising campaigns as well as other details regarding distribution of such advertising content via the user interface 205. Subsequently, that information may be stored in one or more databases included in the computer readable memory and/or other data storage 215. Accordingly, the user interface 205 may be configured to enable an advertiser 10 or other entity to interact with components of the AMS 20 as well as other systems coupled to the system 20 such as WAP GW 30, feedback analysis system 50 and a billing system (not shown) to manage and control distribution of advertising content and analysis of responses thereto as part of one or more marketing or advertising campaigns. Accordingly, the user interface 205 may be implemented as a web-based user interface provided by software stored in the memory 215 or running on one or more servers associated with or supporting the AMS 20.

Further, in accordance with at least one embodiment of the invention, the web interface 205 can be configured to enable the setting of an auction price for delivery of advertising content. Thus, an auction procedure can be used in case of more than one advertiser having advertising content that is appropriate based on the content of a subscriber's message or messages in a communication session. In such an implementation, advertisers may bid on a per-impression basis for placement of advertising content that can be delivered to subscriber's terminals based on a range of criteria, including keywords, geography, demographics, and content type.

The memory 215 may include one or more databases configured to store advertising content, advertiser preferences for distributing advertising content, an archive of advertising content previously sent to a plurality of users and their respective responses to such advertising content as well as the type of advertising content (e.g., SMS, couponing, text-to-win campaign material), rules for selecting advertising content based on message content, etc. Additionally, the memory 215 may also include one or more databases for storing actual advertising content and related distribution parameters for use in distributing the advertising content in connection with campaigns.

It should be understood that memory 215 may include many databases that separately include, for example, subscriber profile information, advertising content, archive data, etc. or some combination or all of this information and data may be included in a single database.

In accordance with at least one embodiment of the invention, matching advertising content may also or alternatively be selected by various other schemes, e.g., combining device user profiles (which may indicate, for example, information about the Subscriber's geographic location, demographic information including age, gender, interests, etc) and preferences with advertisers' target profiles (e.g., demographic information provided by an advertiser regarding target audience for advertising content and delivery preferences). In accordance with at least one embodiment of the invention, matching advertising content may also or alternatively be selected by a round robin scheme, first reserve first serve, randomly etc.

As an explanatory example, presume that Subscriber A (associated with subscriber terminal 90) sends a message to B subscriber (associated with subscriber terminal 95). In this example, it may be assumed that the message is an SMS message. The message is delivered via communication network 40. For example, in one potential configuration, the SMSC 70 may be configured to forward the SMS message to the AMS 20. Alternatively, the SMS message may be forwarded via other intermediate network elements, for example, between HLR 60 and the SMSC 70, which may enable routing of the message via communication network(s) 40 to the AMS 20. It should be appreciated that, such routing of messages may be performed in such a way that all, a portion of or none of the messages are forwarded to the AMS 20. Further, some or all of the AMS 20 functionality may be embedded in SMSC 70 in particular or in network elements included in the communication network(s) 40.

Although not explained in detail above, it should be understood that the AMS 20, the WAP GW 30, and a billing system (not shown) may each or all be implemented using one or more servers including software to coordinate, implement, analyze and report on the delivery of advertising content to device users based on parameters such as keywords, advertising content type, delivery time, method, target consumers, target profiles, etc. Thus, in accordance with at least one embodiment of the invention, the advertiser 10 may receive information regarding the delivery and response rate associated with advertising content distributed in particular formats, e.g., an MMS message; such information may include a delivery report and read-reply report for each recipient of the distributed advertising content.

Figure 3:
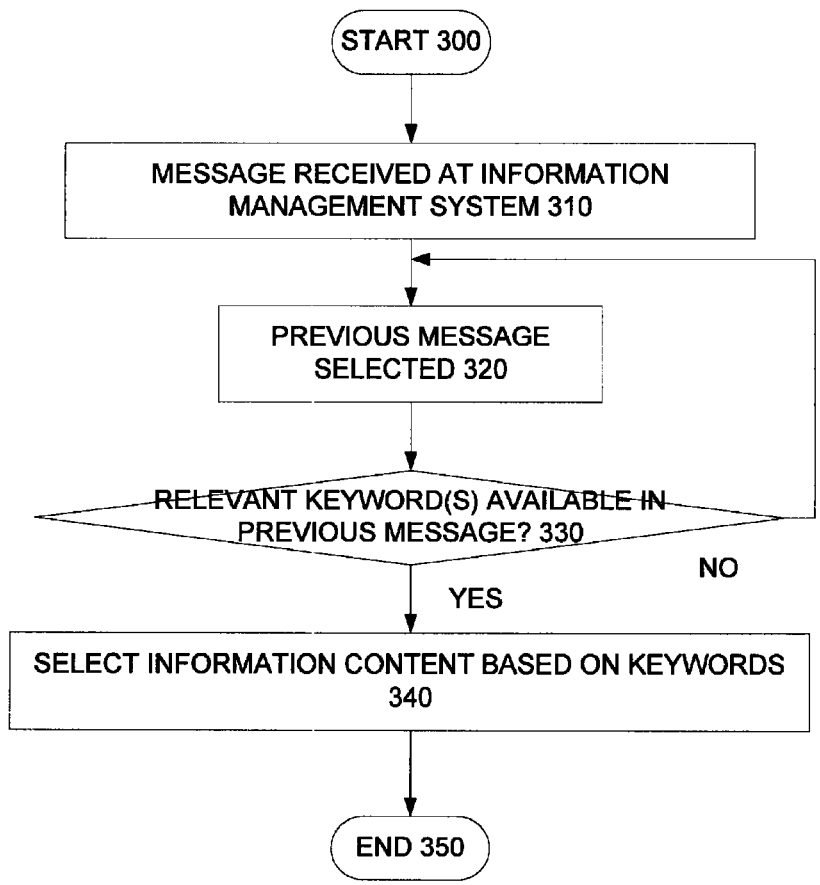
FIGS. 3 to 5 each illustrate a method performed in conjunction with at least one embodiment of the invention.

FIG. 3 illustrates one example of a set of operations performed in accordance with or conjunction with at least one embodiment of the invention. As illustrated in FIG. 3, the methodology may begin at 300 and control may proceed to 310 at which a message sent from Subscriber A to one or more recipients, e.g., Subscriber B, is received at an information management system (e.g., the information management system illustrated in FIGS. 1-2). Such a message may include a query: "Would you like to go to movie tonight?" Control then proceeds to 320, at which a previous message is selected as relating to the received message. Subsequently, control proceeds to 330, at which the content of the previous message is analyzed to determine whether any keywords are available in the previous message.

If there are not, control returns to 320, at which another previous message is selected as relating to the received message and operations for determining whether any keywords are available are again performed.

If so, control proceeds to 340, at which information content, e.g., advertising content, is selected based on the keywords identified in the previous message. Control then proceeds to 340, at which the method operations end.

It should be understood that a previous message may be, for example, any message previously sent by a receiver of the message (e.g., sent to the sender of the message and/or sent to some other receiver, for example, another person, system, Internet service, etc.), any message previously sent by a sender of the message, any message previously received by a receiver of the message, etc.

Figure 4:
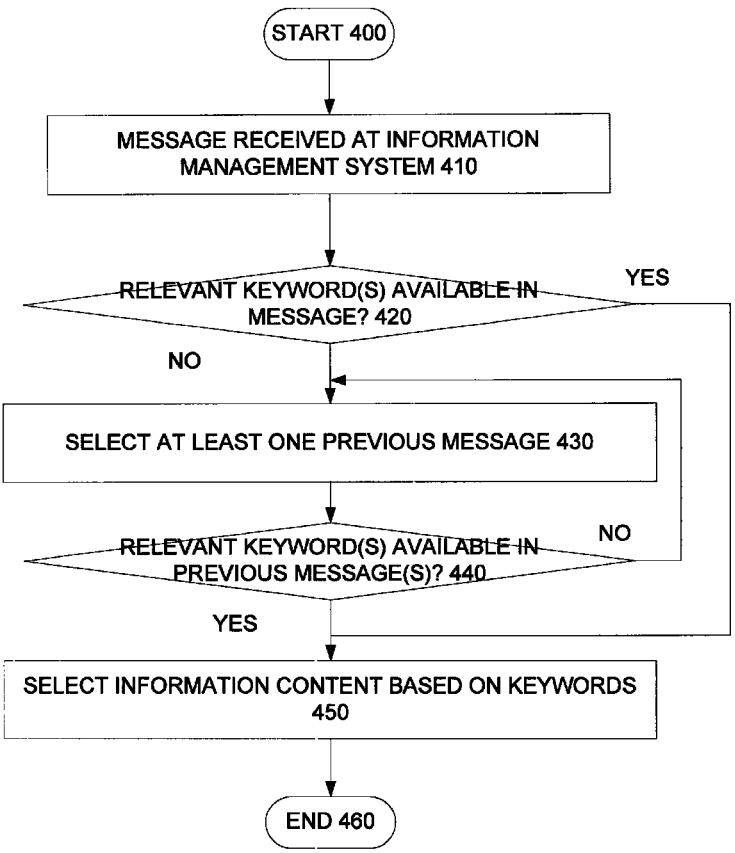

FIG. 4 illustrates another example of a set of operations performed in accordance with or conjunction with at least one embodiment of the invention. As illustrated in FIG. 4, the methodology may begin at 400 and control may proceed to 410 at which a message sent from Subscriber A to one or more recipients, e.g., Subscriber B at an information management system (e.g., the information management system illustrated in FIGS. 1-2). Control then proceeds to 420, at which the message is analyzed to determine whether there are any keywords available in the message.

If there are not, control proceeds to 430 at which a previous message is selected as relating to the received message. Subsequently, control proceeds to 440, at which the content of the previous message is analyzed to determine whether any keywords are available in the previous message. If there are not, control returns to 430, at which another previous message is selected as relating to the received message and operations for determining whether any keywords are available are again performed. If there are keywords available in the received message, control proceeds to 450.

Similarly, if, at 420, it is determined that there are keywords available in the received message, control proceeds to 450, at which information content, e.g., advertising content, is selected based on the keywords identified in the received message or a previous message. Control then proceeds to 460, at which the method operations end.

Figure 5:
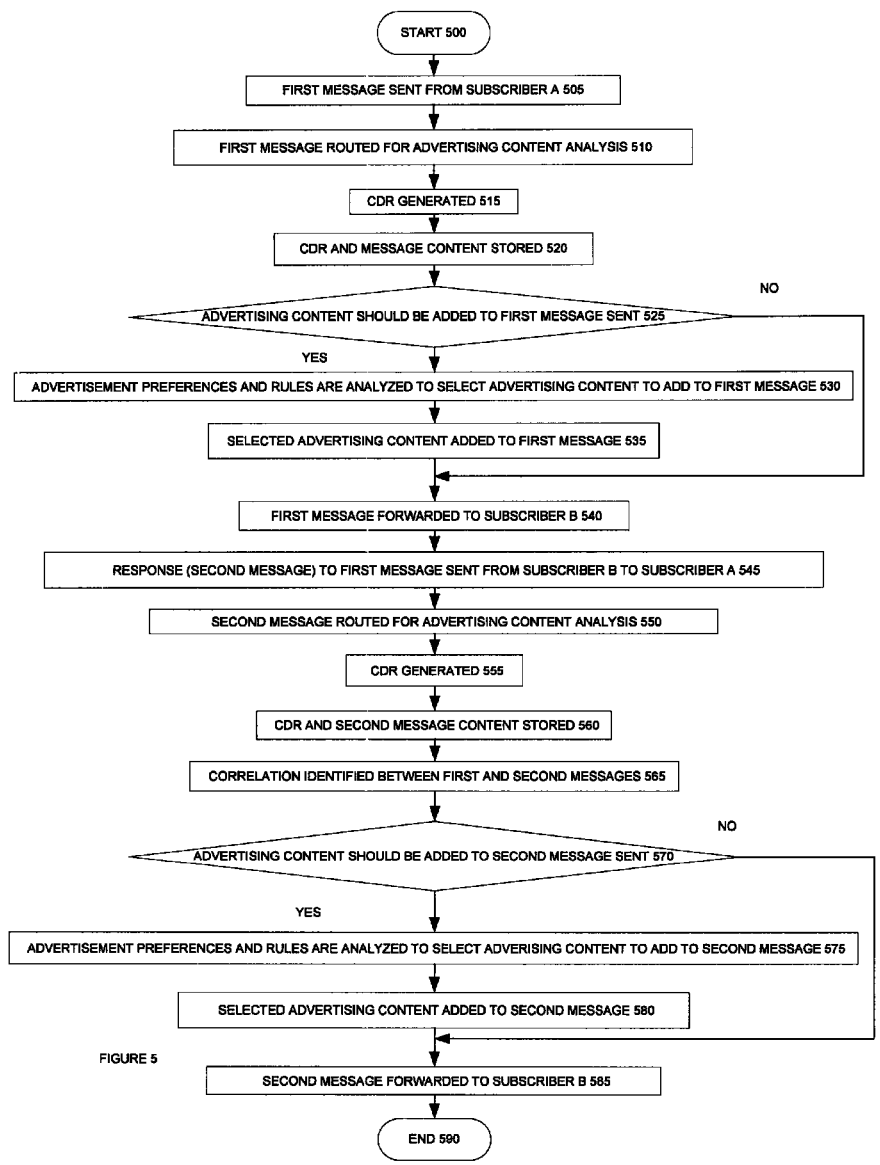

FIG. 5 illustrates yet another, more complicated example of a set operations performed in accordance or conjunction with at least one embodiment of the invention. As illustrated in FIG. 5, the methodology may begin at 500 and control may proceed to 505 at which a message is sent from Subscriber A to one or more recipients, e.g., Subscriber B. Such a message may include a query: "Would you like to go to movie tonight?" Subsequently, that message is routed (for example, to an AMS) for advertising content analysis at 510. Control then proceeds to 515, at which a Call Detail Record (CDR) is generated and continues to 520 at which the content of the message is stored along with the CDR.

Subsequently, control proceeds to 525, at which a determination is made whether advertising content should be added to the message sent at 505 prior to delivery of the message to Subscriber B. By way of example, a first message from A to B may not include advertising content. If no advertising content is to be added, control proceeds to 540, at which the message is forwarded to Subscriber B and control proceeds to 545.

If so, control proceeds to 530, at which advertisement preferences and other rules are analyzed to determine what advertising content to add to the message. Control then proceeds to 535, at which the selected advertising content is added to the message. Subsequently, the first message, with the added advertising content, is forwarded to the Subscriber B at 540.

Once the Subscriber B has received the first message, control proceeds to 545, at which a response to the first message (i.e., a second message) from Subscriber B is sent to Subscriber A. By way of example, such a response may also be a SMS message and include text, e.g., "OK." At 550, the second message is routed in a similar manner as the first message. Control then proceeds to 555, at which a CDR record is generated for the second messages and continues to 560 at which the CDR record is stored along with the content of the second message in a similar manner as with the first message. Control then proceeds to 565, at which a correlation between the first and second messages based on the CDR entries of the respective messages. Moreover, correlation between the first and second message may be determined based, for example, on a length of time interval between the first and second messages, e.g., a shorter time period may indicate a probability that the first and second message are correlated. Alternatively, or in addition, a determination of whether such messages are related may be based on the geographic location of the senders and/or receivers of messages. As such, it should be appreciated that subscriber terminals may include the capability or functionality to indicate location of the mobile terminal in various conventionally understood ways.

Control then proceeds to 570, at which a determination is made whether to include advertising content in the second message prior to the delivery of the second message to Subscriber A. If no advertising content is to be added, control proceeds to 585, at which the second message is forwarded to Subscriber A and control proceeds to 590.

If so, control proceeds to 575, at which advertisement preferences and other rules are analyzed to determine what advertising content to add to the second message. Control then proceeds to 580, at which the selected advertising content is added to the message. As a result, advertisement preferences and other rules are referred to in order to tag the second message with advertising content related to the term "movie" due to identified association or correlation between the first and second messages. Thus, an assumption is made that the keyword "movie" in the first message, and a positive response (e.g. "OK") in the second message, is a probabilistic indicator that Subscribers A and B may be interested in receiving advertising content regarding movies, for example, an invitation and link enabling a access to a content service providing information about movies, e.g., "Visit www.movies.com to reserve tickets." Such a link may or may not be an active link enabling access to the corresponding content service.

Subsequently, the second message, with the added advertising content, is forwarded to the Subscriber B at 585. Control then proceeds to 590, at which the method operations end.

In connection with the generation of the CDR and storage of the CDR and the content of a corresponding message, it should be understood that the entire contents of the message need not be stored. Rather, it is foreseeable that key words may be saved with or without an indication of the types of rules used to analyze those key words. Additionally, it is foreseeable, though not illustrated that some indication to which communication session (e.g., a communication dialog ID) a message (and corresponding CDRs) belongs. Further, records may be generated an maintained that indicate to whom a particular subscriber communicates with frequently for various purposes, for example, aiding in identifying which messages belong in with communication dialogs.

FIG. 6 illustrates an example of a message flow provided between various components of a system provided in accordance with at least one embodiment of the invention. As illustrated in FIG. 6, this is an exchange of messages in a chain of communication messages between Subscribers A and B and the insertion of advertising content in those messages in accordance with at least one embodiment of the invention. Thus, by way of example, as illustrated in FIG. 6, Subscriber A sends a message "Movie tonight?" to Subscriber B in Message 1. As a result, the advertising content: "www.movies.com" is added to Message 1. Thus, the advertising content is selected based on term "movie" in Message 1.

In Message 2, Subscriber B responds to Message 1 by sending a message "What's going?" to Subscriber A. A presumption may then be made that Message 2 from Subscriber B to Subscriber A is related to Message 1 (this presumption may be based on one or more criteria, as explained below). Accordingly, additional movie-related advertising content: "Die Hard 7: Now in Theatres!" may be added even though Message 2 does not contain any terms expressly related to movies.

Thus, in accordance with at least one embodiment of the invention, there are various ways to identify which messages between subscribers belong to specific communication dialogs or sessions. For example, one potential way is to collect a chain of communications between pairs of subscribers and analyze the chain of communications as a whole entity including all or some of the messages. In the above-example, the presumption may be made because, e.g., Message 2 was sent during a predetermined time period (e.g., five minutes) elapsed from the time that Message 1 was, e.g., sent from Subscriber A, read by Subscriber A (if reading notifications are available), etc.

In accordance with endophora analysis, relevancy of advertising content to be added to messages may be enhanced by analyzing the content of Message 2 (for example, by AMS 20 illustrated in FIGS. 1 and 2) and recognizing that Message 2 includes a query based on rules (available to the AMS 20 and, for example, stored in the databases included in memory 215, as illustrated in FIG. 2). For example, such rules may provide examples of query formats that may be used to determine whether a message includes a query, e.g., a query regarding a "type of something" or a "name of something."

Returning to FIG. 6, Subscriber A responds to Message 2 by sending Message 3 stating: "Heard that new Fox is good." Again, relevancy of advertising content to be added to messages in the communication session may be enhanced based on a presumption that Message 3 relates to Messages 1 and 2 based on the time period between Messages 2 and 3; thus, additional movie-related advertising content may be inserted into Message 3 prior to delivery to Subscriber B. Additionally, relevancy of advertising content to be added to messages may be enhanced by analyzing the content of Message 3 (for example, by AMS 20 illustrated in FIGS. 1 and 2) and recognizing that Message 3 includes the terms "new" and "Fox. Based on one or more rules (available to the AMS 20 and, for example, stored in the databases included in memory 215, as illustrated in FIG. 2), it may be determined that Message 3 pertains to a "movie" that is "new" and involves someone named "Fox." Accordingly, based on various information (available to the AMS 20 and, for example, information provided by advertisers of movies, such information being stored in the databases included in memory 215, as illustrated in FIG. 2), advertising content may be added to Message 3 relating to a new movie starring Michael J. Fox: "Back to the Future 15 now in theatres."

Subsequently, as shown in FIG. 6, Subscriber B may respond to Message 3 by sending Message 4: "Sounds good. Where should we go?" Again, relevancy of advertising content to be added to messages in the communication session may be enhanced based on a presumption that Message 4 relates to Messages 1-3 based on, for example, the time period between Messages 3 and 4; thus, additional movie-related advertising content may be inserted into Message 4 prior to delivery to Subscriber B. Additionally, relevancy of advertising content to be added to messages may be enhanced by analyzing the content of Message 4 (for example, by AMS 20 illustrated in FIGS. 1 and 2) and recognizing that Message 4 includes the terms "where" "should" and "go.". Thus, based on one or more rules (available to the AMS 20 and, for example, stored in the databases included in memory 215, as illustrated in FIG. 2), it may be determined that these terms (in context of a movie-related communication session) are likely to indicate that Subscriber B is querying Subscriber A for suggestions about movie theatres. Accordingly, based on various information (available to the AMS 20 and, for example, information provided by advertisers of movies, such information being stored in the databases included in memory 215, as illustrated in FIG. 2), advertising content may be added to Message 4: "50% discount today at Movie Theatre XYZ. Reserve +4412345678." It should further be appreciated that calls to an advertised telephone number adverted can be tracked and, e.g., cost of the call can be charged to an advertiser or additional charge for the advertisement can be charged to an advertiser.

Returning to FIG. 6, Subscriber A may respond to Message 4 by sending Message 5: "How about Movie Theatre XYZ?" Again, relevancy of advertising content to be added to messages in the communication session may be enhanced based on a presumption that Message 5 relates to Messages 1-4 based on, for example, the time period between Messages 4 and 5; additionally, the fact that Message 5 includes the terms "movie" and "theatre," may also be analyzed (based on rules available to the AMS 20 illustrated in FIGS. 1 and 2) to presume that Message 5 relates to Message 4 since it refers to an advertisement added to Message 4. Therefore, identical advertising content or additional but similar advertising content pertaining to the subject of movies, movie theatres or movie theatre ticket offers may be included in Message 5 prior to delivery to Subscriber B.

Returning to the Example of FIG. 6, Subscriber B may reply by sending Message 6 to Subscriber A: "Ok. See u there at 9." Again, based on various rules (available to the AMS 20 illustrated in FIGS.1 and 2), it may be presumed that Message 6 relates to Message 5 (and/or Messages 1-5). For example, the time period between Messages 5 and 6 may indicate that the messages are related and should be part of a common communication session or dialog. Further, analyses of Message 6 contents may recognize that it pertains to an affirmation (e.g., "OK", "Sounds good," "AOK" as well as information indication a place (e.g., "there, "at the theatre," etc.) and the number "9," which may an indication of the time at which Subscriber A and B may meet. Moreover, this type of affirmative response may (based on rules available to the AMS 20 illustrated in FIGS. 1 and 2) indicate an affirmative conclusion to a communication dialog or session. Accordingly, it may be presumed that movie-related messaging may have ended because movie night details have been agreed upon. Thus, Message 6 may be augmented to include advertising content that may still be specific to the movie-related communication dialog but specific to related but ancillary topics, e.g., including advertising content: "Snacks for movie night from Snacks Heaven" prior to delivery of Message 6 to that relates to the movie topic but does not advertise movies directly.

Similarly, an affirmative message (Message 7) sent from Subscriber A to Subscriber B may includes the same advertising content or similar advertising content as Message 6.

Additionally, based on one or mutual affirmative responses, and depending on the rules, a determination may be made that any future communication messages between the subscribers or with other subscriber by either or both of Subscriber A and B are likely to belong to a different (and potentially unrelated) communication dialog or session.

FIG. 7 illustrates a variation to the message flow illustrated in FIG. 6. More specifically, the message flow, or dialog illustrated in FIGS. 6 and 7 are similar in relation to Messages 1-3, 1'-3'. However, as illustrated in FIG. 7, Message 4' differs in that the advertising content added to Message 4' is different because, for example, there was no additional advertising content that available in advertising content inventory (available to the AMS 20 and, for example, stored in the databases included in memory 215, as illustrated in FIG. 2), or there was no information available regarding a new movie involving someone named Fox, produced by a company such as, e.g., 20$^{th}$ Century Fox, a documentary about foxes, etc.

Further, in response to Message 5' illustrated in FIG. 7, Subscriber B replies by sending a Message 6': "Ok. U reserve tickets?" Again, based on various rules (available to the AMS 20 illustrated in FIGS. 1 and 2), it may be presumed that Message 6' relates to Message 5' (and/or Messages 1'-5'). For example, the time period between Messages 5' and 6' may indicate that the messages are related and should be part of a common communication session or dialog. Further, analyses of Message 6' contents may recognize that it pertains to an affirmation (e.g., "OK", "Sounds good," "AOK" as well as the term "tickets." Accordingly, based on various information (available to the AMS 20 and, for example, information provided by advertisers of movies, such information being stored in the databases included in memory 215, as illustrated in FIG. 2), advertising content may be added to Message 6': "Discounted movie tickets from +4412345678." It should further be appreciated that calls to an advertised telephone number adverted can be tracked and, e.g., cost of the call can be charged to an advertiser or additional charge for the advertisement can be charged to an advertiser.

Subsequently, Subscriber A may reply by sending Message 7': "Will do. See u at 9". Again, based on various rules (available to the AMS 20 illustrated in FIGS. 1 and 2), it may be presumed that Message 7' relates to Message 6' (and/or Messages 1'-6'). For example, the time period between Messages 7' and 6' may indicate that the messages are related and should be part of a common communication session or dialog. Further, analyses of Message 7' contents may recognize that it pertains to an affirmation (e.g., "Will do") Thus, this type of affirmative response may (based on rules available to the AMS 20 illustrated in FIGS. 1 and 2) indicate an affirmative conclusion to a communication dialog or session. Accordingly, it may be presumed that movie-related messaging may have ended because movie night details have been agreed upon. Thus, Message 7' may be augmented to include advertising content that may still be specific to the movie-related communication dialog but specific to related but ancillary topics, e.g., including advertising content: "Snacks for movie night from Snacks Heaven" prior to delivery of Message 7' to that relates to the movie topic but does not advertise movies directly.

While this invention has been described in conjunction with the specific embodiments outlined above, it is evident that many alternatives, modifications and variations will be apparent to those skilled in the art. Accordingly, the various embodiments of the invention, as set forth above, are intended to be illustrative, not limiting. Various changes may be made without departing from the spirit and scope of the invention.

For example, it should be understood that the term "advertising content" may include various types of promotional material including any one of or combination of text, pictures, audio, video, links to web-sites or other locations of information, telephone numbers, electronic mail addresses, downloadable files including but not limited to audio files including ring tones, songs, etc, computer implemented games, video files, etc. Also, it should be understood that the term "promotional material" includes any type of content provided in connection with mobile marketing, mobile advertising or other material provided for the purpose of persuading mobile device users.

Moreover, although various embodiment of the invention have been described herein that indicate that the transmission of messages are initiated only by subscribers via subscriber terminals such a mobile devices, it should be understood that, in accordance with at least one embodiment of the invention, at least one message may be initiated from a content service. Thus, advertising content may be added to messages sent to subscribers from content services as well as messages from subscribers. Such an implementation may have particular utility for a mobile device user when, for example, the user purchases a new mobile device and inserts the user's Subscriber Identity Module (SIM) card into the new device in connection with a paid for, free or subsidized service to which the user has subscribed.

Additionally, it should be understood that the content service may be replaced with or augmented with a data service for voice and/or video calls. Likewise, the one or more communication networks provided may not only provide data service but may also be used for voice and video calls.

Further, it should be understood that the functionality described in connection with various described components of various invention embodiments may be combined or separated from one another in such a way that the architecture of the invention is somewhat different than what is expressly disclosed herein. Moreover, it should be understood that, unless otherwise specified, there is no essential requirement that methodology operations be performed in the illustrated order; therefore, one of ordinary skill in the art would recognize that some operations may be performed in one or more alternative order and/or simultaneously.

Various components of the invention may be provided in alternative combinations operated by, under the control of or on the behalf of advertisers, advertising channel provider(s), network providers, marketing organizations, etc.

Further, it should be understood that, in accordance with at least one embodiment of the invention, system components may be implemented together or separately and there may be one or more of any or all of the disclosed system components. For example, the CDR database 65 may be implemented in conjunction with the AMS 20 illustrated in FIG. 1. Further, system components may be either dedicated systems or such functionality may be implemented as virtual systems implemented on general purpose equipment via software implementations.

In accordance with at least one embodiment of the invention, relevancy of advertising content included in one or more messages of a communication session can be enhanced by utilizing a database (e.g., available to the AMS 20 and, for example, stored in the databases included in memory 215, as illustrated in FIG. 2) that contains data indicating commonly used communication terms and phrases and their probabilistic meanings as well as rules indicating or pertaining to common communication message situations and scenarios when those phrases are used and their meaning in such situations. Thus, data regarding common terms and phrases may be collected, e.g., by interviewing subscribers and/or storing communication histories and analyzing those automatically or manually.

As mentioned previously communication sessions may occur between a plurality of subscribers or a subscriber and a receiver or transmitter of information, e.g., a content service provider on the Internet. Thus, depending on content of previously exchanged messages, advertising content may be selected for inclusion in a current or subsequent message(s).

Further, advertising content may be sent as a separate message (e., a same type or format as one or messages in the communication dialog or a different type or format) rather than being embedded in a subscriber's message.

Moreover, although not specifically illustrated or discussed above, one or more of the above-described components (e.g., AMS 20 illustrated in FIGS. 1 and 2) or additional elements may be included in the network 100 that operate or cooperate to identify a correlation between the accessing of a particular content service from a mobile terminal (e.g., subscriber terminals 90, 95 illustrated in FIG. 1) and the transmission of advertising content including a hyperlink. In such an implementation, a "click-thru" type of billing model for distributing advertising content would, therefore, be feasible. Additionally, such an implementation may also enable a business or pricing model wherein, the content service may be provided to the subscriber at a reduced, free or subsidized rate by the subscriber (using, e.g., subscriber terminals 90, 95 illustrated in FIG. 2).

Although invention embodiments have been described wherein advertising content selection is performed in a more centralized manner (e.g., under the direction of the AMS 20 which may be implemented as one or more servers), it should be appreciated that, in accordance with at least one embodiment of the invention, the subscriber terminals may include or be running a software application in which advertising content is selected on of message to be added to communication. For example, supposing that Subscriber A sends a message: "Would you like to go to movies tonight?" to Subscriber B, such an application running in Subscriber B's terminal may perform analyses of keywords of the received message and, output the message content to Subscriber B with advertising content selected based on the keyword(s) included in the message and/or keyword included in previous messages between Subscribers A and B based on rules analysis and endophora analysis described above.

Similarly, the application may also or alternatively be running in a sending subscriber's terminal, e.g., Subscriber A, and advertising content may be selected and input and/or transmitted separately at Subscriber A's terminal.

Further, in accordance with at least one implementation, it is foreseeable that a Subscriber A sends a same message to more than one receiver, e.g., subscriber terminals. Accordingly, in such an implementation the component(s) selecting advertising content (e.g., AMS 20 illustrated in FIGS. 1 and 2) could be configured to identify such parallel messages and determine appropriate content accordingly, e.g., "Ask for group discounts from Movie Theatre XYZ".

Further, correlations identified between keywords and advertising content may be archived and used to further enhance advertising content delivery for advertising additional services and/or products from the originator of the selected advertising content and/or other originators. For example, one exemplary embodiment of this kind of embodiment is to send additional advertising content in a message directly from an advertiser to a subscriber based on previously performed message content analysis (e.g. Movie theatre sends an MMS message about new movies showing in their theatre following the AMS 20 advertising the movie theatre and the subscriber purchasing tickets at the movie theatre).

Additionally, a history of advertising content transmitted to a particular subscriber may be stored and archived (e.g., in memory 215 of AMS 20 illustrated in FIG. 2 or CDR database 65 illustrated in FIG. 1). As a result, an understanding of interests of a particular subscriber could be gained and used to enhance relevance of advertising content transmitted to the subscriber (e.g., archived content indicates that a subscriber is interested in horror movies, is interested in foreign films, is interested in music concerts, etc.)

Further, analysis of message content and advertising content to be transmitted may be performed in whole or part using special application software running in a mobile device.

It should be appreciated that communication dialogs may occur, as explained above, between two subscribers via mobile devices, or may be between a single subscriber and a service, e.g., a content service provided, for example, via the Internet.

Further, it should be understood that, although the above description relates expressly to SMS messaging, at least one embodiment of the invention may be utilized to monitor and analyze communication dialogs of the Instant Messaging (IM) type. Additionally, the advertising content may be added to messages in such communication dialogs as described above. Further, such communication dialogs may include messages of the MMS type, including, for example, picture data and/or video, sound data as well as text. In such a situation, monitoring, analysis and selection of advertising content may be based not only on the text included in an MMS message but also on analysis of one or more pictures, audio and/or video.

Although the utility of various invention embodiments has been described in connection with the selection and insertion of advertising content in messages, it should be understood that information inserted in messages is not limited to advertising content but may also or alternatively include non-advertising material, e.g., information pertaining to the communication dialog that includes a particular message.

Additionally communication sessions might refer to situation where a subscriber sends one or more messages to one or more receivers. Advertisement message could be selected to these communications based on one or more previous (or current) messages independently if same subscriber has been receiving any messages or not.

Further communication session might refer to situation where a subscriber receives one or more messages from one or more senders. Advertisement message could be selected to these messages based on one or more previously received messages independently of the sender of the messages or by based on message which is to be received.

Further communication session might refer to situation where many subscribers are sending messages to many subscriber. The selected advertisement might be selected on basis of one or more of previous (or current) messages from and to one or more subscribers.

It should be understood that various connections are set forth between elements in the following description; however, these connections in general, and, unless otherwise specified, may be either direct or indirect, either permanent or transitory, and either dedicated or shared, and that this specification is not intended to be limiting in this respect. As a result, it will be apparent for those skilled in the art that the illustrative embodiments described are only examples and that various modifications can be made within the scope of the invention as defined in the appended claims.

The invention claimed is:

1. A computer implemented method of selecting information content for transmission in connection with a current message, the method comprising:
   selecting, by a processor, a previous message to the current message;
   identifying, by the processor, one keyword in the previous message;
   determining, by the processor, that the current message and the previous message belong to a first communication dialog upon a determination that the content of the current message and the previous message relate to each other;
   selecting, by the processor, information content for transmission in connection with the current message based on the one keyword in the previous message when the current message and the previous message belong to the first communication dialog; and
   determining, by the processor, that the first communication dialog concludes with the current message when the content of the current message includes an affirmative response, wherein a subsequent message to the current message is part of a second communication dialog different than the first communication dialog and the current message is not part of the second communication dialog.

2. The computer implemented method of claim 1, wherein the previous message is sent by a receiver of the current message.

3. The computer implemented method of claim 2, wherein the previous message is a message sent to a sender of the current message.

4. The computer implemented method of claim 1, wherein the previous message is a message sent by a sender of the current message.

5. The computer implemented method of claim 1, wherein the previous message is a message received by a receiver of the current message.

6. The computer implemented method of claim 1, wherein the information content is added to the current message.

7. The computer implemented method of claim 1, wherein the information content is transmitted as a separate message than the current message.

8. The computer implemented method of claim 1, wherein the previous message is sent from a first mobile terminal to a second mobile terminal.

9. The computer implemented method of claim 1, wherein the previous message is sent from a first mobile terminal to a content service provider.

10. The computer implemented method of claim 1, wherein the current message is sent from a content service provider to a first mobile terminal.

11. The computer implemented method of claim 1, wherein the current message is sent from a first mobile terminal to a plurality of second mobile terminals.

12. The computer implemented method of claim 1, further comprising appending the selected information content to the current message prior to transmitting the information content to a second mobile terminal wherein the transmission of the information content to the second mobile terminal occurs as part of delivery of the current message to the second mobile terminal.

13. The computer implemented method of claim 1, wherein the previous message is a Short Messaging Service message.

14. The computer implemented method of claim 1, wherein the previous message is a Multi-Media Service message.

15. The computer implemented method of claim 1, further comprising transmitting the selected information content and the current message to an intended recipient.

16. The computer implemented method of claim 1, wherein determining that the current message and the previous message belong to the first communication dialog is based on a time period occurring between the previous message and the current message.

17. The computer implemented method of claim 1, further comprising:
   generating, by the processor, call detail records for the previous message and the current message; and
   storing, in a database, the generated call detail records.

18. The computer implemented method of claim 17, wherein determining that the current message and the previous message belong to the first communication dialog is based on an analysis of the call detail records.

19. The computer implemented method of claim 1, wherein selecting information content for transmission with the current message is based on the one keyword of the previous message and at least one keyword identified in the current message.

20. The computer implemented method of claim 19, wherein the selecting information content for transmission with the current message based on the at least one keyword of the current message is based on a plurality of rules indicating probabilistic assumptions regarding subject matter of the current message based on the presence of one or more keywords.

21. The computer implemented method of claim 1, wherein the selecting information content for transmission with the current message is also based on at least one keyword of the current message.

22. The computer implemented method of claim 1, wherein the selecting information content for transmission with the current message is based on keywords identified in a plurality of messages determined to be part of the first communication dialog.

23. The computer implemented method of claim 1, wherein the selecting information content for transmission with the current message based on the at least one keyword is based on a plurality of rules indicating probabilistic assumptions regarding subject matter of the current message based on the presence of one or more keywords.

24. The computer implemented method of claim 1, wherein information content includes one of data, text, pictures, audio, video, links to web-sites, location information, telephone numbers, electronic mail addresses, HyperText Markup Language data, eXtensible Markup Language data, eXtensible HyperText Markup Language or downloadable files.

25. The computer implemented method of claim 1, wherein the information content is advertising content.

26. An article of manufacture for selecting information content for transmission in connection with a current message, the article of manufacture comprising a non-transitory machine readable medium containing one or more programs which when executed implement the steps of: selecting a previous message to the current message; identifying at least one keyword in the previous message; determining that the current message and the previous message belong to a first communication dialog, upon a determination that the content of the current message and the previous message relate to each other; selecting information content for transmission in connection with the current message based on the at least one keyword in the previous message, when the current message and the previous message belong to the first communication dialog; and determining that the first communication dialog concludes with the current message when the content of the current message includes an affirmative response, wherein a subsequent message to the current message is part of a second communication dialog different than the first communication dialog and the current message is not part of the second communication dialog.

27. The article of manufacture of claim 26, wherein the previous message is sent by a receiver of the current message.

28. The article of manufacture of claim 27, wherein the previous message is a message sent to a sender of the current message.

29. The article of manufacture of claim 26, wherein the previous message is a message sent by a sender of the current message.

30. The article of manufacture of claim 26, wherein the previous message is a message received by a receiver of the current message.

31. The article of manufacture of claim 26, wherein the information content is added to the current message.

32. The article of manufacture of claim 26, wherein the information content is transmitted as a separate message than the current message.

33. The article of manufacture of claim 26, wherein the previous message is sent from a first mobile terminal to a second mobile terminal.

34. The article of manufacture of claim 26, wherein the previous message is sent from a first mobile terminal to a content service provider.

35. The article of manufacture of claim 26, wherein the current message is sent from a content service provider to a first mobile terminal.

36. The article of manufacture of claim 26, wherein the current message is sent from a first mobile terminal to a plurality of second mobile terminals.

37. The article of manufacture of claim 26, wherein the steps further comprise appending the selected information content to the current message prior to transmitting the information content to a second mobile terminal wherein the transmission of the information content to the second mobile terminal occurs as part of delivery of the current message to the second mobile terminal.

38. The article of manufacture of claim 26, wherein the previous message is a Short Messaging Service message.

39. The article of manufacture of claim 26, wherein the previous message is a Multi-Media Service message.

40. The article of manufacture of claim 26, wherein the steps further comprise transmitting the selected information content and the current message to an intended recipient.

41. The article of manufacture of claim 26, wherein the determining that the current message and the previous message belong to the first communication dialog is based on a time period occurring between the previous message and the current message.

42. The article of manufacture of claim 26, wherein the steps further comprise generating and storing call detail records for the previous message and the current message.

43. The article of manufacture of claim 42, wherein the determining that the current message and the previous message belong to the first communication dialog is based on an analysis of the call detail records.

44. The article of manufacture of claim 26, wherein selecting information content for transmission with the current message is based on the at least one keyword of the previous message and one keyword identified in the current message.

45. The article of manufacture of claim 44, wherein the selecting information content for transmission with the current message based on the at least one keyword of the current message is based on a plurality of rules indicating probabilistic assumptions regarding subject matter of the message based on the presence of one or more keywords.

46. The article of manufacture of claim 26, wherein the selecting information content for transmission with the current message is also based on at least one keyword of the current message.

47. The article of manufacture of claim 26, wherein the selecting information content for transmission with the current message is based on keywords identified in a plurality of messages determined to be part of the first communication dialog.

48. The article of manufacture of claim 26, wherein the selecting information content for transmission with the current message based on the at least one keyword is based on a plurality of rules indicating probabilistic assumptions regarding subject matter of the current message based on the presence of one or more keywords.

49. The article of manufacture of claim 26, wherein information content includes one of data, text, pictures, audio, video, links to web-sites, location information, telephone numbers, electronic mail addresses, HyperText Markup Language data, eXtensible Markup Language data, eXtensible HyperText Markup Language or downloadable files.

50. The article of manufacture of claim 26, wherein the information content is advertising content.

51. A system comprising:
a processor; and
a memory containing instructions that, when executed, cause the processor to:
select a previous message to a current message;
identify at least one keyword in the previous message;
determine that the current message and the previous message belong to a first communication dialog upon a determination that the content of the current message and the previous message relate to each other
select information content for transmission in connection with the current message based on the one keyword in the previous message when the current message and the previous message belong to the first communication dialog; and
determine that the first communication dialog concludes with the current message when the content of the current message includes an affirmative response, wherein a subsequent message to the current message is part of a second communication dialog different than the first communication dialog and the current message is not part of the second communication dialog.

52. The system of claim 51, wherein the previous message is sent by a receiver of the current message.

53. The system of claim 52, wherein the previous message is a message sent to a sender of the current message.

54. The system of claim 51, wherein the previous message is a message sent by a sender of the current message.

55. The system of claim 51, wherein the previous message is a message received by a receiver of the current message.

56. The system of claim 51, wherein the information content is added to the current message.

57. The system of claim 51, wherein the information content is transmitted as a separate message than the current message.

58. The system of claim 51, wherein the previous message is sent from a first mobile terminal to a second mobile terminal.

59. The system of claim 51, wherein the previous message is sent from a first mobile terminal to a content service provider.

60. The system of claim 51, wherein the current message is sent from a content service provider to a first mobile terminal.

61. The system of claim 51, wherein the current message is sent from a first mobile terminal to a plurality of second mobile terminals.

62. The system of claim 51, wherein the instructions further cause the processor to:
append the selected information content to the current message prior to transmitting the information content to a second mobile terminal wherein the transmission of the information content to the second mobile terminal occurs as part of delivery of the current message to the second mobile terminal.

63. The system of claim 51, wherein the previous message is a Short Messaging Service message.

64. The system of claim 51, wherein the previous message is a Multi-Media Service message.

65. The system of claim 51, wherein the instructions further cause the processor to:
transmit the selected information content and the current message to an intended recipient.

66. The system of claim 51, wherein determining that the current message and the previous message belong to the first communication dialog is based on a time period occurring between the previous message and the current message.

67. The system of claim 51, wherein the instructions further cause the processor to:
generate call detail records for the previous message and the current message; and
store the generated call detail records.

68. The system of claim 67, wherein determining that the current message and the previous message belong to the first communication dialog is based on an analysis of the call detail records.

69. The system of claim 51, wherein selecting information content for transmission with the current message is based on the at least one keyword of the previous message and at least one keyword identified in the current message.

70. The system of claim 69, wherein the selecting information content for transmission with the current message based on the one keyword of the current message is based on a plurality of rules indicating probabilistic assumptions regarding subject matter of the current message based on the presence of one or more keywords.

71. The system of claim 51, wherein the selecting information content for transmission with the current message is also based on one keyword of the current message.

72. The system of claim 51, wherein the selecting information content for transmission with the current message is based on keywords identified in a plurality of messages determined to be part of the first communication dialog.

73. The system of claim 51, wherein the selecting information content for transmission with the current message based on the one keyword is based on a plurality of rules indicating probabilistic assumptions regarding subject matter of the current message based on the presence of one or more keywords.

74. The system of claim 51, wherein information content includes one of data, text, pictures, audio, video, links to web-sites, location information, telephone numbers, electronic mail addresses, HyperText Markup Language data, eXtensible Markup Language data, eXtensible HyperText Markup Language or downloadable files.

75. The system of claim 51, wherein the information content is advertising content.

76. A non-transitory computer-readable medium containing instruction that, when executed by a computing device, cause the computing device to:
select a previous message to a current message;
identify at least one keyword in the previous message;
determine that the current message and the previous message belong to a first communication dialog upon a determination that the content of the current message and the previous message relate to each other
select information content for transmission in connection with the current message based on the at least one keyword in the previous message when the current message and the previous message belong to the first communication dialog; and
determine that the first communication dialog concludes with the current message when the content of the current message includes an affirmative response, wherein a subsequent message to the current message is part of a second communication dialog different than the first communication dialog and the current message is not part of the second communication dialog.

77. The non-transitory computer-readable medium of claim 76, wherein the previous message is sent by a receiver of the current message.

78. The non-transitory computer-readable medium of claim 77, wherein the previous message is a message sent to a sender of the current message.

79. The non-transitory computer-readable medium of claim 76, wherein the previous message is a message sent by a sender of the current message.

80. The non-transitory computer-readable medium of claim 76, wherein the previous message is a message received by a receiver of the current message.

81. The non-transitory computer-readable medium of claim 76, wherein the information content is added to the current message.

82. The non-transitory computer-readable medium of claim 76, wherein the information content is transmitted as a separate message than the current message.

83. The non-transitory computer-readable medium of claim 76, wherein the previous message is sent from a first mobile terminal to a second mobile terminal.

84. The non-transitory computer-readable medium of claim 76, wherein the previous message is sent from a first mobile terminal to a content service provider.

85. The non-transitory computer-readable medium of claim 76, wherein the current message is sent from a content service provider to a first mobile terminal.

86. The non-transitory computer-readable medium of claim 76, wherein the current message is sent from a first mobile terminal to a plurality of second mobile terminals.

87. The non-transitory computer-readable medium of claim 76, wherein the instructions further cause the computing device to:
append the selected information content to the current message prior to transmitting the information content to a second mobile terminal wherein the transmission of the information content to the second mobile terminal occurs as part of delivery of the current message to the second mobile terminal.

88. The non-transitory computer-readable medium of claim 76, wherein the previous message is a Short Messaging Service message.

89. The non-transitory computer-readable medium of claim 76, wherein the previous message is a Multi-Media Service message.

90. The non-transitory computer-readable medium of claim 76, wherein the instructions further cause the computing device to:
transmit the selected information content and the current message to an intended recipient.

91. The non-transitory computer-readable medium of claim 76, wherein determining that the current message and the previous message belong to the first communication dialog is based on a time period occurring between the previous message and the current message.

92. The non-transitory computer-readable medium of claim 76, wherein the instructions further cause the computing device to:
generate call detail records for the previous message and the current message; and
store the generated call detail records.

93. The non-transitory computer-readable medium of claim 92, wherein determining that the current message and the previous message belong to the first communication dialog is based on an analysis of the call detail records.

94. The non-transitory computer-readable medium of claim 76, wherein selecting information content for transmission with the current message is based on the at least one keyword of the previous message and one keyword identified in the current message.

95. The non-transitory computer-readable medium of claim 94, wherein the selecting information content for transmission with the current message based on the at least one keyword of the current message is based on a plurality of rules indicating probabilistic assumptions regarding subject matter of the current message based on the presence of one or more keywords.

96. The non-transitory computer-readable medium of claim 76, wherein the selecting information content for transmission with the current message is also based on at least one keyword of the current message.

97. The non-transitory computer-readable medium of claim 76, wherein the selecting information content for transmission with the current message is based on keywords identified in a plurality of messages determined to be part of the first communication dialog.

98. The non-transitory computer-readable medium of claim 76, wherein the selecting information content for transmission with the current message based on the at least one keyword is based on a plurality of rules indicating probabilistic assumptions regarding subject matter of the current message based on the presence of one or more keywords.

99. The non-transitory computer-readable medium of claim 76, wherein information content includes one of data, text, pictures, audio, video, links to web-sites, location information, telephone numbers, electronic mail addresses, HyperText Markup Language data, eXtensible Markup Language data, eXtensible HyperText Markup Language or downloadable files.

100. The non-transitory computer-readable medium of claim 76, wherein the information content is advertising content.

* * * * *